United States Patent
Johnstad et al.

(10) Patent No.: US 7,456,632 B2
(45) Date of Patent: Nov. 25, 2008

(54) METHOD FOR MONITORING LOW-RESISTIVITY FORMATION USING POLARIZED WAVES

(75) Inventors: Svein Erling Johnstad, Bønes (NO); Fan-Nian Kong, Oslo (NO); Harald Westerdahl, Dal (NO)

(73) Assignee: Norsk Hydro ASA, Oslo (NO)

( * ) Notice: Subject to any disclaimer, the term of this patent is extended or adjusted under 35 U.S.C. 154(b) by 20 days.

(21) Appl. No.: 10/549,913

(22) PCT Filed: Mar. 22, 2004

(86) PCT No.: PCT/NO2004/000079

§ 371 (c)(1), (2), (4) Date: Jun. 9, 2006

(87) PCT Pub. No.: WO2004/086090

PCT Pub. Date: Oct. 7, 2004

(65) Prior Publication Data

US 2006/0255809 A1    Nov. 16, 2006

(30) Foreign Application Priority Data

Mar. 27, 2003 (NO) .................................. 20031424

(51) Int. Cl.
G01V 3/08 (2006.01)
G01V 3/12 (2006.01)

(52) U.S. Cl. ........................... 324/337; 324/334

(58) Field of Classification Search ................. 324/323, 324/324, 334, 337–339, 365; 166/66; 367/14, 367/36, 37

See application file for complete search history.

(56) References Cited

U.S. PATENT DOCUMENTS

| | | |
|---|---|---|
| 3,440,523 A | 4/1969 | Gabillard |
| 6,366,858 B1 | 4/2002 | Haugland |
| 6,480,000 B1 * | 11/2002 | Kong et al. .................. 324/338 |

(Continued)

FOREIGN PATENT DOCUMENTS

WO    0000849    1/2000

*Primary Examiner*—Jay M Patidar
(74) *Attorney, Agent, or Firm*—Wenderoth, Lind & Ponack, L.L.P.

(57) ABSTRACT

A method for monitoring a high-resistivity reservoir rock formation (2) below one or more less resistive formations (3). The method includes transmitting an electromagnetic signal (S) propagating from near a seafloor or land surface (1) by means of an electromagnetic transmitter (5) powered by a voltage signal generator (G). The electromagnetic signal (S) propagates from the seafloor (1) and is guided along a conductive string (7) to the high-resistive formation (2), and propagates as a guided-wave electromagnetic signal (S2) at a relatively higher speed (V2) inside the high-resistivity formation (2) than a propagation speed (V3) in the less resistive formations (3). The guided-wave electromagnetic signal (S2) gives rise to an upward refracting electromagnetic signal (R3) having the relatively lower propagation speed (V3) in the less resistive formations (3) and having an exit angle nearer to the normal (N) to the interface between the high-resistivity formation (2) and the lower-resistivity formation (3), and gives rise to a steeply rising refraction wave front (F3). The refracted electromagnetic wave front (F3) includes refracted electromagnetic signals (R3) detected along an array of sensor antennas ($6a, 6b, 6c, \ldots, 6k, \ldots, 6n$) positioned along the seafloor. The array having a direction away from the transmitter (5).

17 Claims, 18 Drawing Sheets

U.S. PATENT DOCUMENTS 6,696,839 B2    2/2004    Ellingsrud et al.
6,859,038 B2 *    2/2005    Ellingsrud et al. .......... 324/334
7,145,341 B2 *    12/2006    Ellingsrud et al. .......... 324/334
2003/0011371 A1    1/2003    Rosthal et al.

* cited by examiner

The material model of Fig. 9, indicating a metal casing extending from the seafloor at 2500 m to a total depth of 5000 m into the rocks, with an EM transmitter source on the casing at the seafloor. A high-resistivity oil-bearing rock layer is indicated.

The electromagnetic field intensity according to the model of Fig. 9b. T= 30 000 microseconds.

The electromagnetic field intensity according to the model of Fig. 9b, except for a short casing that stops at 3000 m depth below sea surface, or 500 m below seafloor. T= 30 000 microseconds.

The electromagnetic field intensity according to the model of Fig. 9b, except there being no casing at all in the well. T= 30 000 microseconds.

A comparison between amplitudes as measured at the seabed in the imagined situations of having no casing, a short casing and a long casing.

The electromagnetic field intensity according to the model of Fig. 9b, except there being no high resistivity layer.
T= 30 000 microseconds.

METHOD FOR MONITORING LOW-RESISTIVITY FORMATION USING POLARIZED WAVES

BACKGROUND OF THE INVENTION

1. Technical Field

Petroleum bearing formations usually are of high resistivity (low conductivity) due to non-conductive oil or gas having replaced conductive salt-containing water (brine) in the pores of the rock. The resistivity normally is reduced as brine replaces oil or gas during production, or increases if brine is substituted or flushed by fresh water or gas. This difference in resistivity may be used for monitoring a reservoir during production, or for distinguishing between petroleum-bearing and brine-bearing parts of a formation.

2. Description of Related Art

Generating an electromagnetic signal from a towed antenna is used for exploring sedimentary seabed formations below the seafloor. A typical resistivity of seawater, $\rho_{sw}$, may be about 0.3 Ωm, which is rather conductive. Attenuation of electromagnetic wave propagation is thus very high. This high conductivity (or low resistivity) of the seawater prevents much of the EM signal that is transmitted from the towed antenna in the water masses to reach even the seafloor. A rather small, attenuated portion of the energy that reaches the seafloor propagates further through the rock beds, some of it downwards. The wave energy is partly reflected, partly refracted by formations having varying electromagnetic properties, and some of the energy propagates back to the surface of the seafloor. At the seafloor the EM waves must be detected by means of EM receivers, and then analyzed.

A Norwegian Patent, NO 310 383 to Statoil, describes electromagnetic guided wave propagation along a conductive string in a well. The guided wave is reflected by resistivity transitions in a petroleum production well. Due to oil being replaced by a brine water front from below, near the production well, repeated measurements of such reflected guided waves are used for monitoring the rising water front during a considerably long time span, e.g. during months or years. No wave propagation far from the well is considered; only the immediate near-well volumes of fluids are measured.

Norwegian Patent application NO 20020203 from Statoil describes a method and an apparatus for determining properties of an underground reservoir. That application mentions a transmitter antenna arranged in a well penetrating a formation, in which well the transmitter antenna is arranged near the formation of interest. NO 20020203 mentions that the casings pipe may be used as an antenna, in that a portion of the casing is insulated above the portion actually used for constituting a dipole transmitter antenna. The casing must be insulated and modified for the method to work. A power supply is lowered into the well casing and forced towards the inner surface of that casing. A significant disadvantage of NO20020203 in case of arranging the antenna in the well is due to the fact that the operation to lower the antenna to the required depth in the well is relatively complicated. Additionally, the operation of lowering the antenna inside the well most often requires that in such a well, in case of being a production well, production must be shut down temporarily. Providing electrical energy for such a downhole transmitter antenna arranged near the actual production zone may be difficult, requiring long electrical supply lines. For a well being drilled, the operation of arranging a downhole transmitter antenna would most probably be out of the question due to drilling economy and power supply problems. Another significant problem is mentioned in Statoil's Patent application in page 4, line 7 to 8: Pulses are subject to strong dispersion in the conductive medium, i.e. while propagating from the surface, downwards through the overburden conductive sediments. This means that not much signal remains to return to the surface to be measured.

Patent application NO 20020203 discusses insulating the transmitter antenna, i.e. a part of a conductive casing. Below, we will describe that it is feasible to use a non-insulated transmitter antenna on the seabed, and still achieve a significantly better signal transmission.

Another Patent application, NO20020202 from Statoil, also discusses delineating a hydrocarbon bearing rock layer, presumably of high-resistivity, using refracted EM waves from guided waves in that rock layer. NO20020202 correctly recognizes that the detected refracted waves may be less attenuated than a direct EM wave or large offsets, but does not discuss using a transmitter antenna at the upper part of a casing with the casing acting as signal guide down to the reservoir.

NO20020202 states that a towed dipole antenna having a length from 100 to 1000 meters is preferred.

International Patent application WO 0157555 from Den norske stats oljeselskap as and Norges Geotekniske Institutt: "Method and apparatus for determining the nature for subterranean reservoirs", describes a transmitter antenna arranged at the seafloor, and a corresponding receiver antenna also arranged at the seafloor. This set-up is made for investigating a deep reservoir layer otherwise known from seismic surveys. A refractive wave component is sought in the wave field response, to determine the nature of the reservoir. WO 0157555 stresses the fact that a propagating electro-magnetic wave through a hydrocarbon [rock] layer is much less attenuated than an EM wave propagating in a water-bearing stratum, while the speed is much higher in the hydrocarbon-bearing layer. Thus, far from the transmitter antenna, the refracted wave will be far less attenuated than the reflected wave, or a direct wave. WO 0157555 also mentions at page 4, line 33 that the transmitter may be inside an existing well. WO 0157555 also mentions that the reservoirs of interest may be about 1 km or more below the seabed, and continues saying "In order to carry out electromagnetic surveying as a stand alone technique in these conditions, with any reasonable degree of resolution, short wavelengths are necessary. Unfortunately, such short wavelengths suffer from very high attenuation. Long wavelengths do not provide adequate resolution. For these reasons, seismic techniques are preferred".

SUMMARY OF THE INVENTION

A general concept of this invention is to let a metallic casing help to guide parts of the EM energy from the surface, through conductive overburden, deeply down into a high-resistivity hydrocarbon reservoir. A first purpose of the invention relates to the problem of mapping the extent of a high-resistivity layer indicating a petroleum bearing rock bed, as opposed to a possible continuation of the same geological layer into a brine-saturated volume of the same rock bed, or another low-resistivity rock bed.

A second purpose of the invention relates to a second problem of monitoring the change of a high-resistivity layer with respect to extent, thickness or conductivity, indicating movement of the oil and/or water during production.

A third purpose of the invention relates to a third problem of transmitting a signal into a high-resistivity layer below a low-resistivity layer which normally attenuates the signal strongly on its way down. This purpose of injecting the energy may be dual: both of injecting a signal sufficient to propagate far and to be returned to the surface for being measured, and also for possibly stimulating the reservoir as mentioned below.

The invention allows injecting EM energy into a reservoir by transmitting an electromagnetic signal along a conductive string, e.g. a metallic casing, into the high-resistivity layer and also into the more conductive layers above and below.

As illustrated in FIG. 3c, one way of more efficiently transmitting an electro-magnetic signal that may propagate far into the high-resistivity formation may be using a toroidal coil transmitter antenna around the top of the casing. A toroidal coil antenna will generate a magnetic field H surrounding transversely to the casing and an electrical field directed normal to H. In FIG. 3c, the steel-lined well penetrates as a deviated well into the actual formation. Part of this wave will propagate along the steel-liner and thus continue propagating far in the horizontal direction, also beyond the extent of the conductive string, due to polarizing vertically in a low-conductive medium, in which few charges can be moved. A solenoidal transmitter coil will generate a transverse-electric (TE) field.

Also, an ordinary coil (solenoid) on the seabed around the top of the casing may produce an electrical field around the casing, a so-called transverse-electric mode signal.

A fourth purpose of the invention relates to a fourth problem of monitoring the penetration progress of a drill bit that is approaching a high-resistivity formation. Drilling is an expensive process, so a petroleum company would normally proceed as fast as possible through non-productive sedimentary and other rock formations in order to reach the productive strata fast. Contrary to this desire, it may be highly desirable to core the contact between the covering formations (item 3 in FIGS. 1, 2 and 3) and the desired low-conductivity petroleum bearing rock formation 2. Thus a fourth embodiment of the invention relates to a method for monitoring the electromagnetic response on the seabed from signals transmitted by means of a drill string making a borehole.

A fifth purpose of the invention relates to stimulating petroleum production from a petroleum reservoir by injecting energy into the reservoir. Energy may enter the reservoir as an alternating electrical or magnetic field of propagating electromagnetic waves that may polarise molecules and vibrate the polarized molecules. Part of the energy is dispersed into heat in the reservoir or heat in the rocks above or below the reservoir. The entire process of injecting energy is believed to stimulate petroleum production due to mechanisms not yet easily understood, but heating the fluids to decrease the viscosity and thus increasing the mobility of the petroleum fluids, may be one, but probably not the only explanation.

The above mentioned problems are solved by the invention which is a method for monitoring a high-resistivity reservoir rock formation below one or more less resistive formations, in which the method comprises the following steps:

transmitting an electromagnetic signal propagating preferably along a conductive metallic string from near the seafloor by means of an electromagnetic transmitter at the seafloor or close to the seafloor, and powered by a voltage or current signal generator;

whereby the electromagnetic signal propagates from the seafloor to the high-resistive formation, and propagates as a guided-wave electromagnetic signal at a relatively higher speed inside the high-resistivity formation than a propagation speed in the less resistive overlying formations;

whereby the electromagnetic signal gives rise to an upward refracting electromagnetic signal having the relatively lower propagation speed in the less resistive formations and has an exit angle nearer to the normal N to the interface between said high-resistivity formation and the lower-resistivity formation, and giving rise to a steeply rising refraction wave front.

The refracted electromagnetic wave front, comprising refracted electromagnetic signals, is detected along an array of electromagnetic receivers along the seafloor, in which the array has a direction away from the transmitter.

In a preferred embodiment of the invention, the electromagnetic transmitter may comprise a toroidal coil or regular coil antenna transmitting the electromagnetic signal to the upper end of an electrically conductive string, e.g. a steel casing or liner. The electrically conductive steel casing guides EM energy from the surface down to the desired formation.

Contrary to what is normally believed to be feasible, in one embodiment of the invention an electromagnetic transmitter comprising electrodes can be used, of which one is connected to an upper end of the electrically conductive string, of which the upper end is near the seafloor. The other electrode is normally situated at a more remote location and grounded into the seabed or seawater, or connected to another metal cased borehole.

BRIEF DESCRIPTION OF THE DRAWINGS

The invention is illustrated in the attached drawing figures. The drawings are meant for illustrating the invention only, and shall not be construed to limit the invention, which shall be limited by the claims only.

FIG. 11, is short, extending from the seafloor and 500 meters down into the low-resistivity formation. Thus the steel casing ends far above the high-resistivity formation.

DETAILED DESCRIPTION OF THE INVENTION

Figure 1:
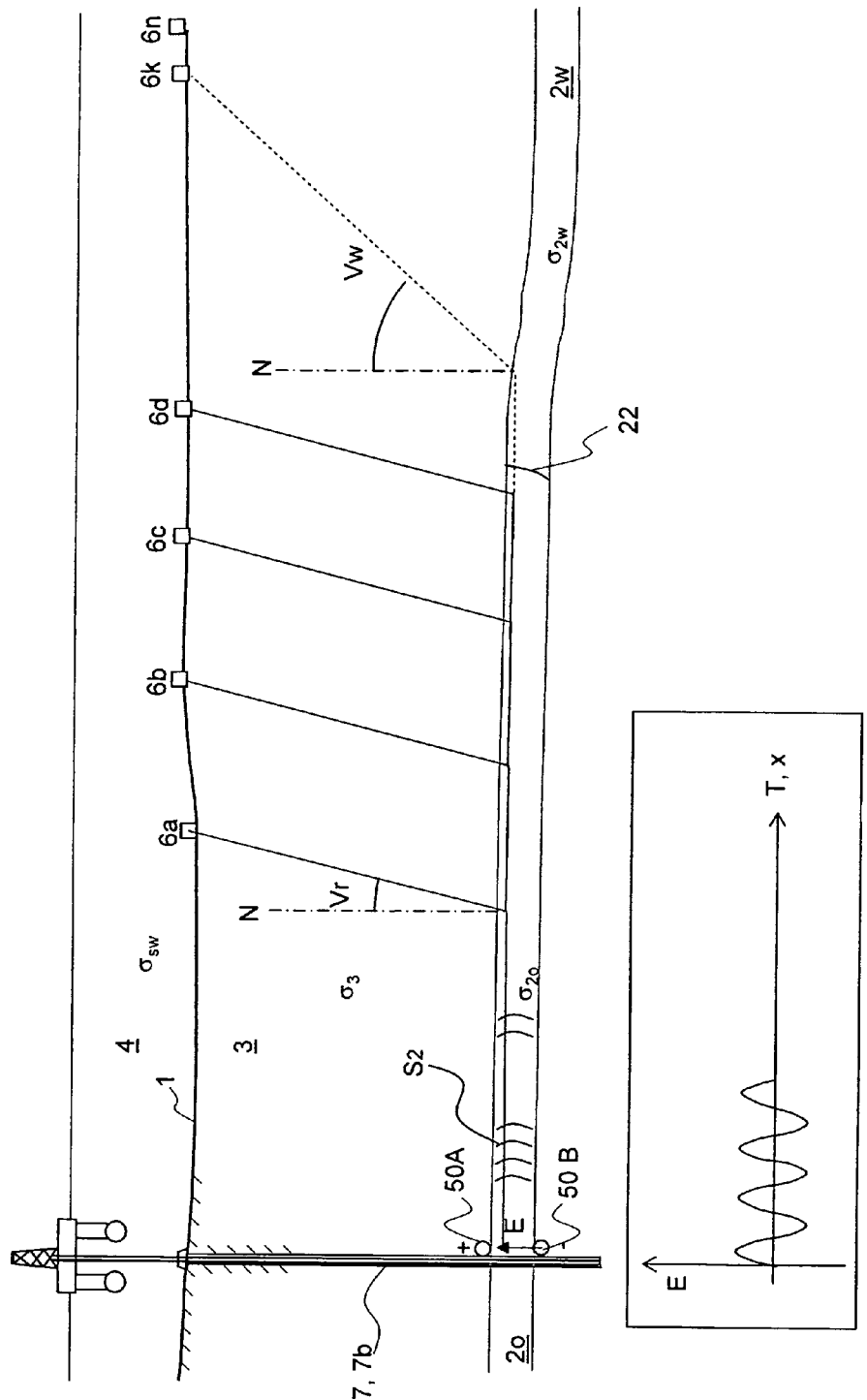
FIG. 1 illustrates a vertical cross section of an imagined subsea petroleum field, having a subsea petroleum well lined by a casing, the well penetrating a high-resistivity formation buried below formations of lower resistivity. A transmitter antenna is arranged downhole, near the high-resistivity formation, and may represent the known art.

FIG. 1 illustrates a situation in which an antenna 50 of an electromagnetic transmitter 5 is arranged in a borehole 7b through low-resistivity formations 3, and in which the borehole 7b also penetrates a high-resistivity petroleum fluid bearing formation 2. The antenna 50 is arranged at the outside of a conductive casing 7 for transmitting an electromagnetic signal S into the high-resistivity formation 2. As the electromagnetic waves propagate through the formations, eventually refracted electromagnetic waves are received on the surface 1 of the overburden geological formations 3. The surface 1 may be a seafloor or a land surface. The surface may, in the method of this method, not be the sea surface except for rather shallow applications, due to severe seawater attenuation of EM signals. A separation line 22 in the fluid bearing formation 2 indicates a transition from an oil-filled portion 20 of the high-resistivity formation 2 and a water-filled lower-resistivity portion of the formation 2w.

Figure 2:
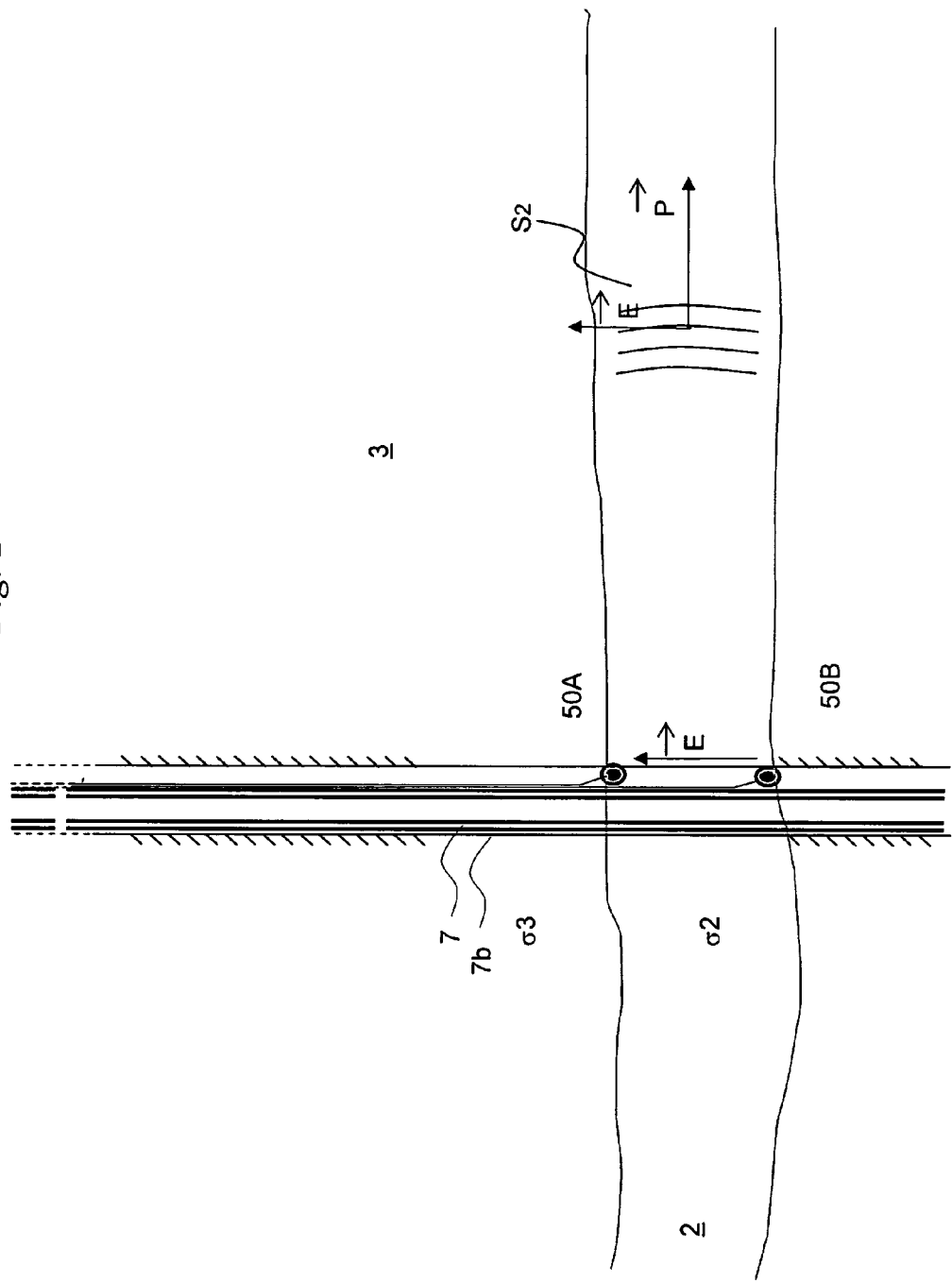
FIG. 2 is a close-up illustration of a part of FIG. 1, showing a portion of the casing penetrating the high-resistivity formation. The antennas illustrated here generate a vertical electric field E, which will propagate into the high-resistivity formation.

FIG. 2 illustrates a more detailed portion of FIG. 1, showing a portion of the casing 7 in that part of the borehole 7b penetrating the high-resistivity petroleum-fluid bearing formation 2. The transmitter antennas 50 are arranged near the casing adjacent to this penetrated high-resistivity formation 2. Independently of which particular transmitter method used to generate an electromagnetic wave intended to propagate as a guided wave inside a high-resistivity rock formation, it is essential for extensive propagation that an E field be formed near-perpendicular to an upper and lower interface between the high-resistivity rock formation 2 and more conductive layers 3 above and below. Thus, the E field generated cannot move present charges to any significant degree, and very little electrical current is formed, a current that would be quickly attenuated in the conductive layer 3. Thus, having an E field perpendicular to the interfaces above and below the high-resistivity layer 2, an EM wave may propagate far as a guided wave inside of the high-resistivity layer 2. This principle applies to most of this application. As discussed above, while commenting on the known art, we mentioned that a significant disadvantage of NO20020203 in a case of arranging the antenna in the well is, that the operation for lowering the antenna to the required depth in the well, is relatively complicated and which additionally most often requires that the well, in the case of being a production well, must be shut down temporarily. Additionally, providing electrical energy for a downhole transmitter antenna producing a significantly strong signal, arranged near the actual production zone, may be difficult. The situation of FIGS. 1 and 2 is similar to, but not entirely the same as the one of NO20020203, in that the high-resistivity zone in question in this application does not "outcrop" along the seafloor in our example. However, the description below describes a solution to some of the problems discussed above.

Figure 3A:
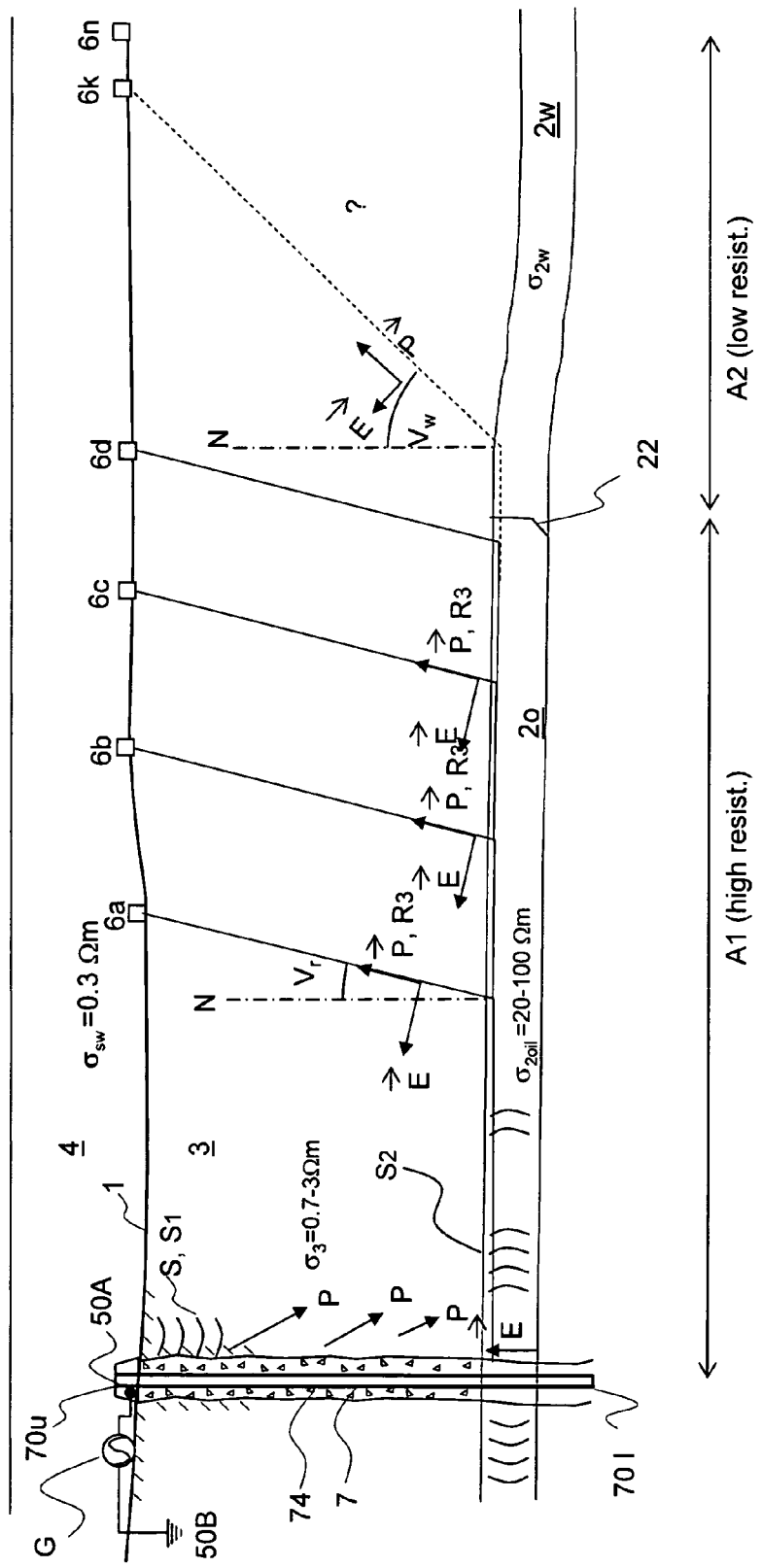
FIG. 3a illustrates one preferred embodiment of the invention. In the upper portion of the sheet is illustrated a vertical cross section similar to FIG. 1. In an embodiment of the invention an electrical voltage generator is connected to a part of a conductive casing being near the seafloor. The lower portion of the sheet is a plane view illustration sketch of TE and TM-mode responses above a high-resistivity reservoir formation.

FIG. 3a illustrates one preferred embodiment of the invention in which part of the generated EM signal propagates from the surface or seafloor 1 and down to a high-resistivity formation 2 along a conductive string 7. We will demonstrate below that this significantly improves signal transmission down to the high-resistivity formation 2, and further increases the proportion of energy that may be refracted back to the seafloor 1. In this preferred embodiment, the electro-magnetic transmitter 5 antenna 50 is formed by connecting an AC electric voltage signal from an electrical power signal generator G by using an electrode 50A coupled to a conducting string 7 near the seafloor 1, resulting in a guided wave propagating along the conducting string 7 in the borehole. The conducting string 7 may be a steel casing or liner or similar, or a drillstring. In the case of the present invention, it is not considered strictly necessary to insulate any part of the casing 7 in order to obtain a signal transmission, although it is possible and probably advantageous to partly insulate an upper portion of the casing partially, e.g. by painting. The other, opposite electrode 50B from the voltage generator G is grounded into the seabed or into the seawater somewhere else than the top of the casing. Preferably, in the present invention, a power of about 10 kW is desirable to use, with a frequency between 0.1 Hz and 1 kHz. The downhole portion of the conducting string 7 that penetrates a high-resistivity petroleum fluid bearing formation 2 will form a part of an antenna 50 transmitting a less attenuated, and thus stronger electromagnetic signal, possibly also containing a broader frequency spectrum due to lower attenuation of the higher frequencies, downhole, into the high-resistivity formation 2. As with the example of FIG. 1, electromagnetic waves are guided through the high-resistivity formation 2 and refracted upwards to the lower-resistivity overburden geological formations 3 and finally received on the surface 1, i.e. on the seafloor or on the dry surface. Typical resistivity values are indicated in FIG. 3a: For seawater 4, $\rho_{sw}$ is about 0.2 to 0.3 Ωm; for the low-resistivity formations 3, $\rho_3$ may be 0.7 to 10 Ωm, and for the high-resistivity formation 2 containing oil, $\rho_{2oil}$ may be 20 to 100 Ωm. For the water-bearing parts of formation 2, $\rho_{2water}$ may be 0.7 to 3 Ωm, similar to the resistivity of the overlying low-resistivity formations 3. The EM signal in this example, may propagate inside the high-resistivity formation 2 as an almost vertical polarization vector E along a Poynting vector P. This Poynting vector P is the vector product E×H, of which the Poynting vector P is directed in the direction of propagation, and E and H are perpendicular to each other and to the direction of propagation. Due to the high contrast in electrical properties, and thus high contrast in propagation velocities, the refracting wave direction from a horizontal high-resistivity formation into a low-resistivity formation will be very steep, with P directed steeply in the rock formations 3 above the low-conductive part of formation 2. Beyond the oil-water contact zone 22, P will be much less refracted and thus directed less steeply if at all refracted into the low-resistivity formation 3 from the low-resistivity water-bearing formation 2w. Similarly, beyond the oil-water contact zone 22, the refracted E vector will be subhorizontal above the low-conductive part of formation 2, and E directed somewhat more steeply while refracted from the more conductive water-bearing formation 2w. The same effect takes place for the transition from the low-resistivity rock formation 3 to the even more conductive seawater 4, resulting in an almost horizontal E vector above and along the seabed. Thus antennas 6a, 6b, 6c, . . . , 6k, . . . , 6n on the seafloor 1 may be arranged generally horizontally for the purpose of delineating the outline of the low-resistivity reservoir portion of formation 2 according to the present invention.

Normally, a casing pipe 7 is cemented to the borehole wall by using cement 74 in the annulus between the outer surface of the casing pipe 7 and the borehole wall, along the portions of the casing pipe 7 penetrating overlying non-productive rock formations 3 and into the reservoir. For the cement 74, the resistivity $\rho_{74}$ of cement having hardened for two weeks was measured in the NGI laboratory to be between 50 to 100 Ωm or more, which is higher than the assumed resistivity of the low-resistivity formations 3, $\rho_3$ indicated above to be 0.7 to 10 Ωm. The conductive string 7 being partly insulated by an outside cement coating 74 would provide improved waveguide properties for an electromagnetic signal S through the low-resistivity formation 3.

In a situation described above, connecting an AC electrical source to the casing, there will be no net transport of current, and only a signal transmission over a limited time, say a few seconds up to a few minutes, depending on synchronised use of the transmitter-receiver system which may both easily be remote controlled, so there would be no significant corrosion of the casing due to this method.

Figure 3B:
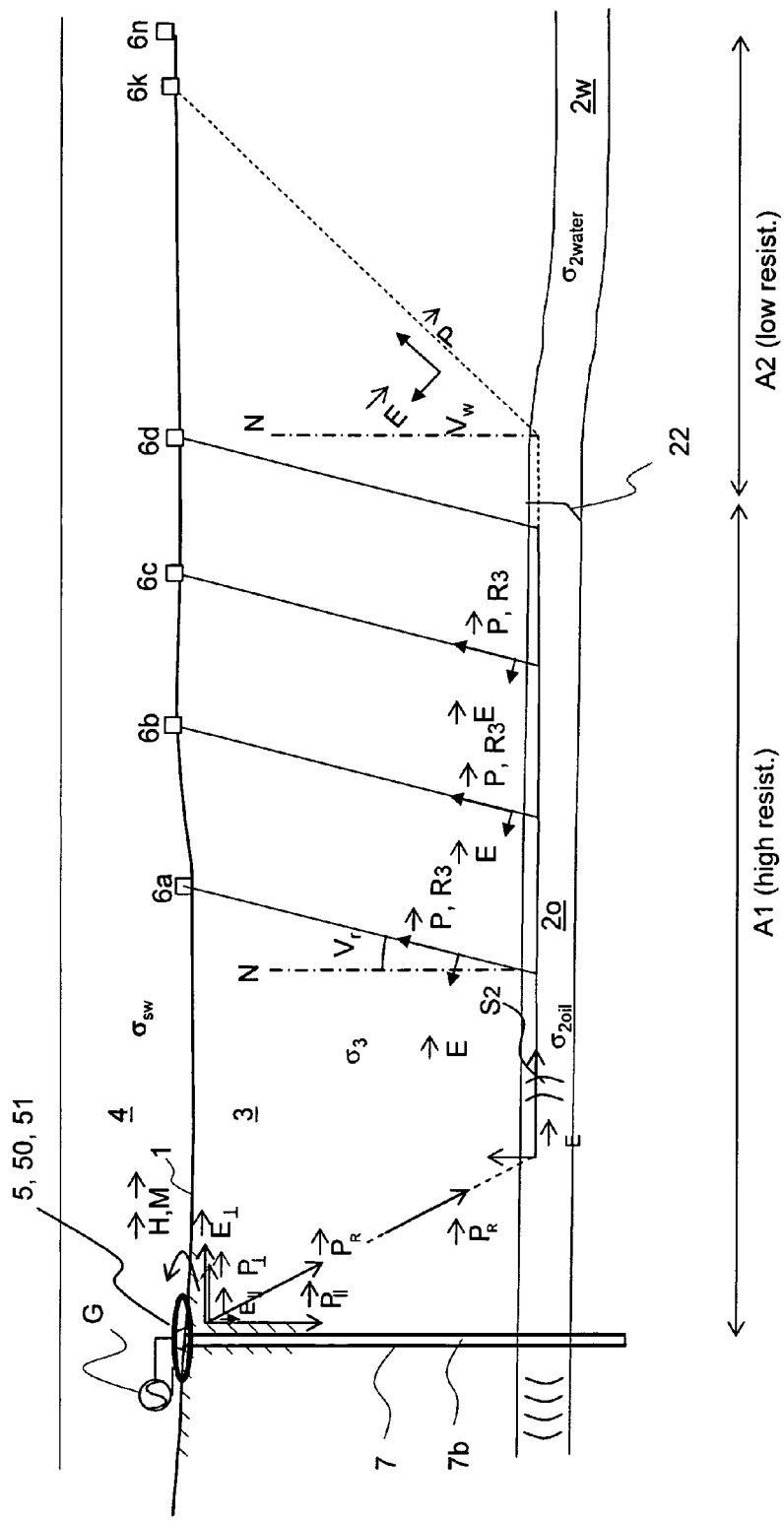
FIG. 3b is similar to FIG. 3a, and illustrates an embodiment of the invention differing from the one mentioned above in having a ring-shaped toroid or solenoid antenna arranged around that part of the casing that extends up to or slightly above the seafloor.

In FIG. 3b, a steel-cased well penetrates the high-resistivity petroleum-bearing rock formation 2, and the well 7b is generally vertical. A toroidal coil wound around a ring core is arranged near the seafloor, and around the conductive casing string or similar conductive string. The toroidal antenna may advantageously be provided with a ring core 51 having high magnetic permeability. In this case, the electric component fields $E_\perp$, $E_\parallel$ are generated normal to and parallel with the conductive string 7. The magnetic inducing field H is illustrated, and the Poynting vector components $P_\perp$ and $P_\parallel$ generated normal to and parallel with the conductive string 7 are also illustrated, together with the resultant Poynting vector components $P_r$. One will see that the P vector generated will propagate downwards along the casing string 7 and into the geological strata, and may refract into the low-resistivity layer 2 to become parallel to the high-resistivity layer 2.

One significant feature of the invention may thus be achieved: a transmitter antenna at the surface is generating a signal which is propagating less attenuated down to the formation 2 in which it may propagate. The E component being normal to the interfaces above and below formation 2 may be guided inside the high-resistivity formation 2 and become refracted and be picked up at the surface to be analyzed and for delineating the extent and characterizing properties for formation 2. Other vector directions being "unfortunate" for the extent of propagation may be more fortunate for injecting energy into the formation 2 or to heat conductive layers 3 immediately above (and below) formation 2, and thus stimulate the oil production from formation 2.

Figure 3C:
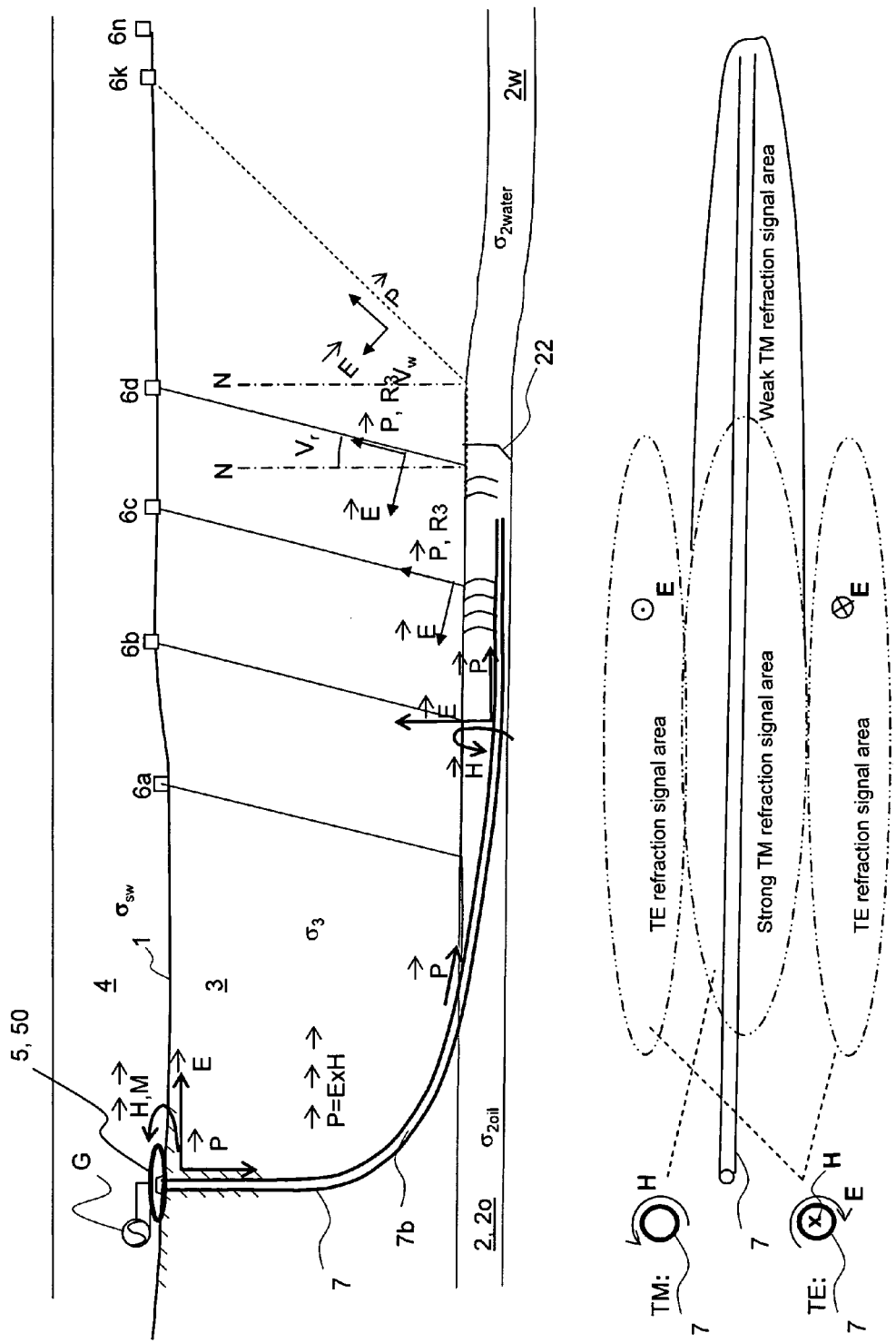
FIG. 3c is similar to FIG. 3b, illustrating one embodiment of the invention differing from the above mentioned in that a deviated well has been drilled into a high-resistivity formation.

As with FIG. 3b, FIG. 3c illustrates a toroidal coil arranged e.g. near the seabed and around the conductive casing. The toroidal coil generates what is called a Transverse Magnetic mode (TM) signal having the E field directed transversely with respect to the conductive axis, i.e. the axis of the conductive string 7. In that illustrated embodiment of the invention, the well with conductive casing 7 or a similar, conductive production pipe, is deviated into the subhorizontal high-resistivity formation 2. As will emerge from the drawing, the E field will be generated normal to the axis of the conductive string 7, and the H field will be generated about the axis of the same conductive string, thus Poynting vector P will be directed along the conductive string 7. The deviated conductive string will thus rotate the propagating vector setup 90 degrees so that a stronger E field may be generated subvertically inside the low-conductivity formation 2 above (and below) the conductive string. This stronger E field is thus potentially able to propagate far in formation 2, to form a strong refracted signal to be picked up by antennas 6a, 6b, 6c, ..., 6k, ..., 6n at the seabed above the oil-bearing portions of the formation 2. In the lower part of FIG. 3c a horizontal section of the well along the vertical section above is illustrated. A "strong refraction area" is shown above the oil-bearing formation 2, and a "weak refraction area" is illustrated beyond the far side of the oil-bearing formation 2, i.e. above the water-bearing formation 2w.

Figure 3D:
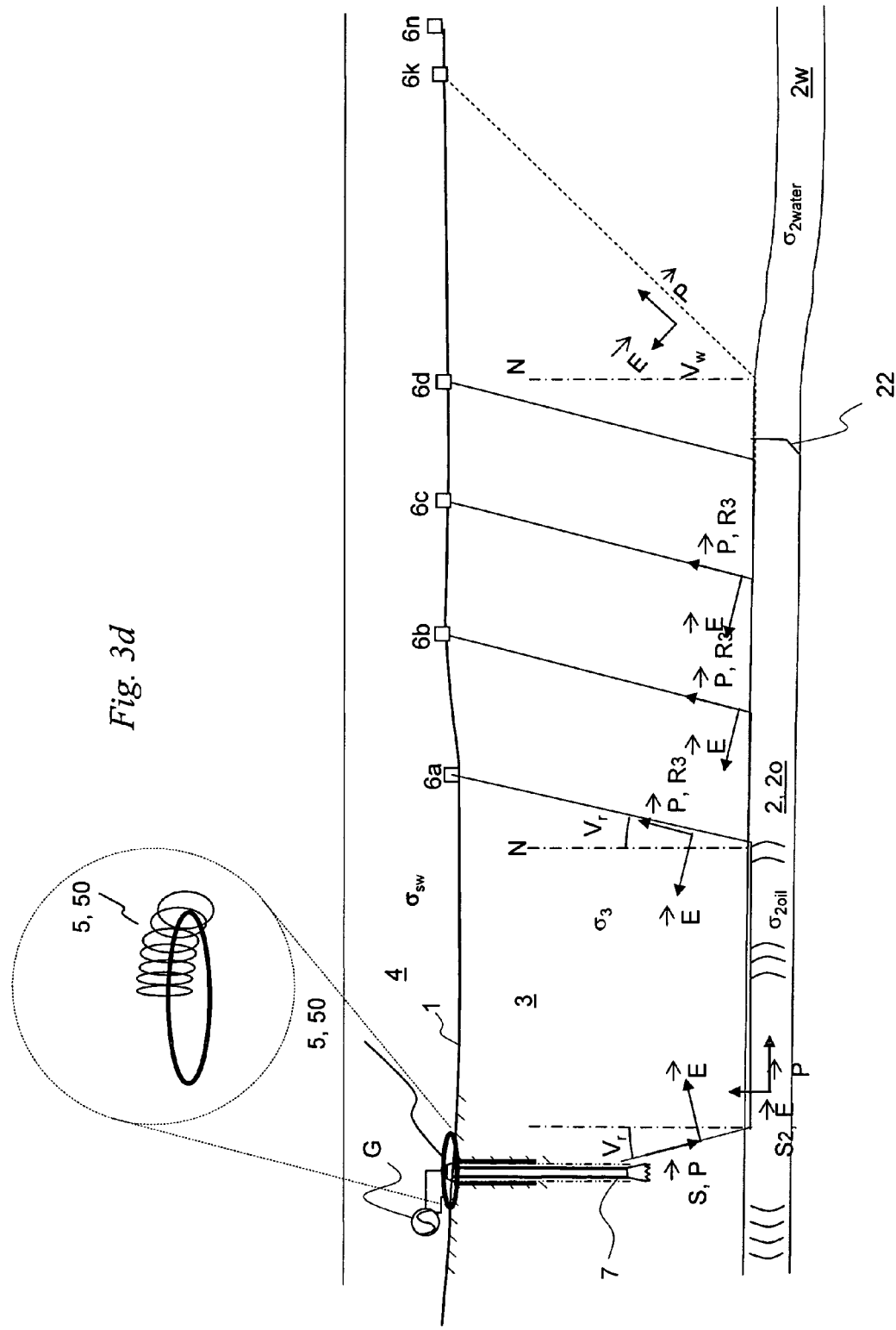
FIG. 3d illustrates an embodiment of the invention, in which a well is being drilled, with the drilling string approaching a high-resistivity formation.

FIG. 3d illustrates an embodiment of the invention using a transmitter antenna around the upper part of a conductive drillstring. If the transmitter antenna is a toroidal coil, and the well is vertical, the P vector may radiate in a desirable angle from the axis of the drillstring near the end of the drillstring, resulting in refraction of the P vector propagating more or less along the low-resistivity formation 2 and associated with a rather strong sub-vertical E field which may propagate well into the low-resistivity formation 2. Thus an EM wave may be guided through the low-resistive layer 2 to become refracted EM waves that may be picked up along the seabed far from the drillstring. While the drillstring is far above the low-resistive layer 2 there should be a rather weak refracted signal. But when the drillstring approaches the low-resistive formation 2, the refracted wave component should have a characteristic development of intensity and/or phase near the interface between the over (and under) lying interface(s) and the high-resistivity formation 2. Modelling or using empirical data for such a drilling transition, the drilling team may forecast the approach of the interface. Thus one should be enabled to stop drilling and use core drilling through the transition from overlying non-petroleum-bearing rocks and into the petroleum bearing formation. Simultaneously, as a gas cap often is found on top of a reservoir, it will be advantageous to know more precisely when the drillstring is approaching to such a gas cap, to prevent an undesired pressure rise in the well.

Figure 4:
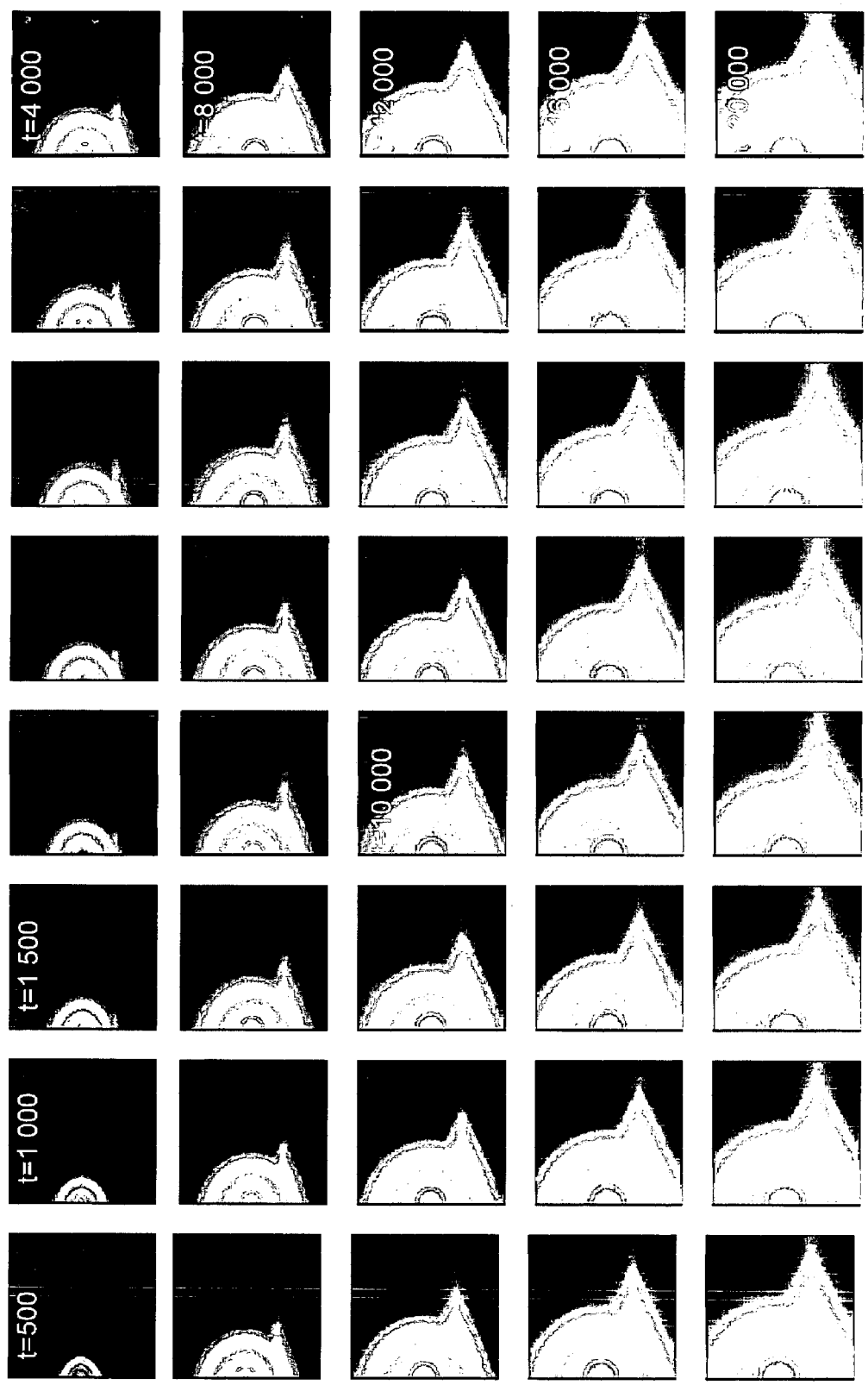
FIG. 4 illustrates a series of images of calculated vertical sections through a highly simplified model of a low-resistivity formation having a thinner high-resistivity horizontal formation situated somewhere in the lower half of the image. The formations are penetrated by a well at the left side of each image. The well is lined with a conductive casing. An electromagnetic signal is generated halfway down the conductive casing. The images of the calculated intensity of the propagating electromagnetic field are shown in consecutive time sections having 500 microseconds interval, starting at 500 microseconds and ending with 20 000 microseconds.

FIG. 4 illustrates a series of images of calculated vertical sections through a highly simplified model of a low-resistivity formation having a thin high-resistivity horizontal formation situated somewhere in the lower half of the image. The formations are penetrated by a well at the left side of each image. The well is lined with a conductive casing. An electromagnetic signal is generated halfway down the conductive casing. The images of the calculated intensity of the propagating electromagnetic field are shown in consecutive time sections having 500 microseconds interval, starting at 500 microseconds and ending with 20000 microseconds. The purpose of FIG. 4 is to illustrate field propagation without seawater in the model, and to prepare the reader for the more elaborated model underlying the calculated images of FIG. 9, in which seawater is introduced, and in which the transmitter antenna 50 is arranged at the seafloor on a conductive casing.

Figure 5:
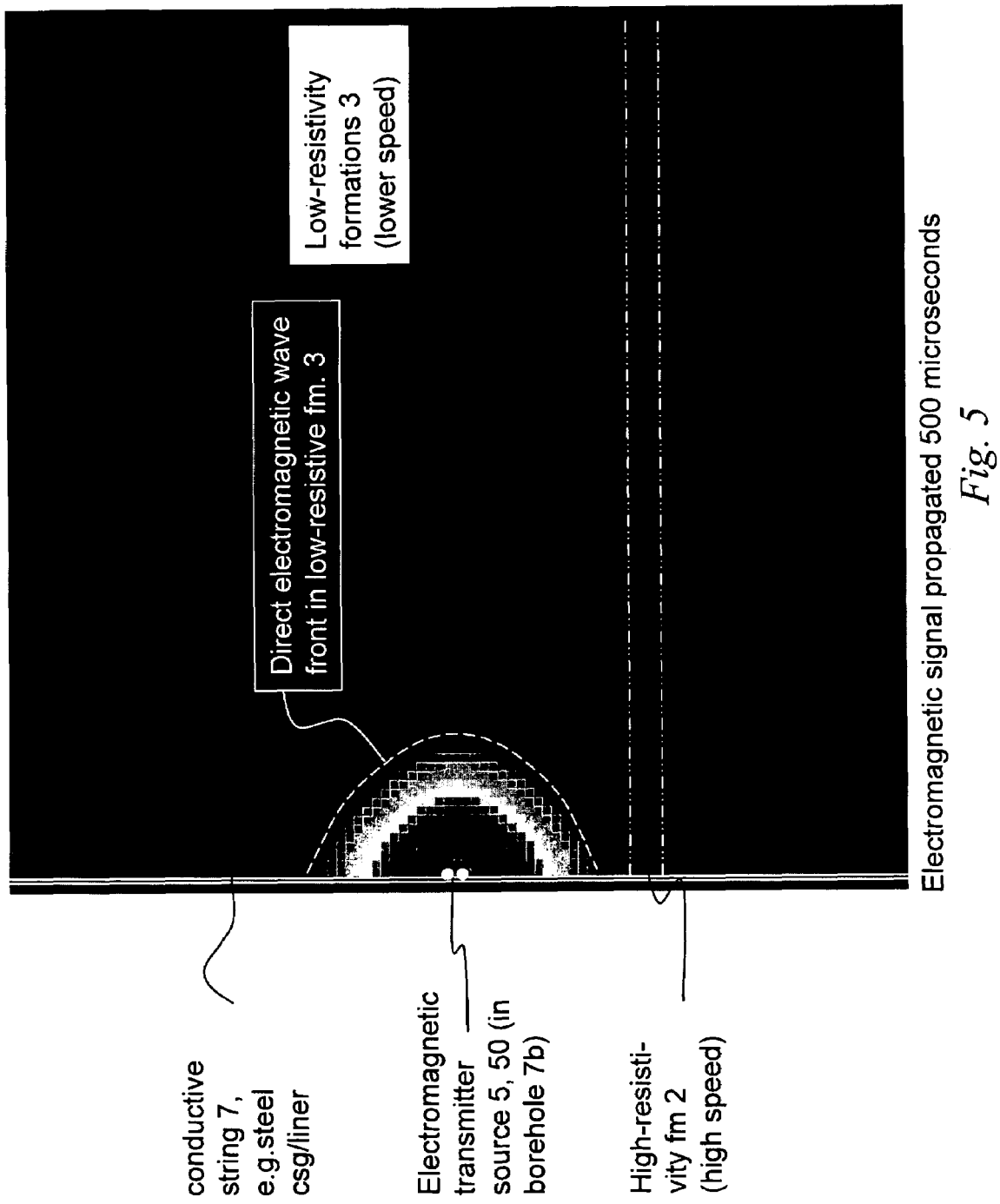
FIG. 5 is an enlarged image of the first calculated time section at 500 microseconds. To the left is indicated the conductive string with the EM transmitter antenna. In the lower part a high-resistivity formation is indicated. From the image one will see that the EM field front propagates in a near-spherical manner as a direct wave.

FIG. 5 is an enlarged image of the first calculated time section at 500 micro-seconds. To the left is indicated the conductive string 7 with the EM transmitter antenna 50. In the lower part a high-resistivity formation 2 is indicated. From the image one will see that the EM field front propagates in a near-spherical manner as a direct wave front $F_1$.

Figure 6:
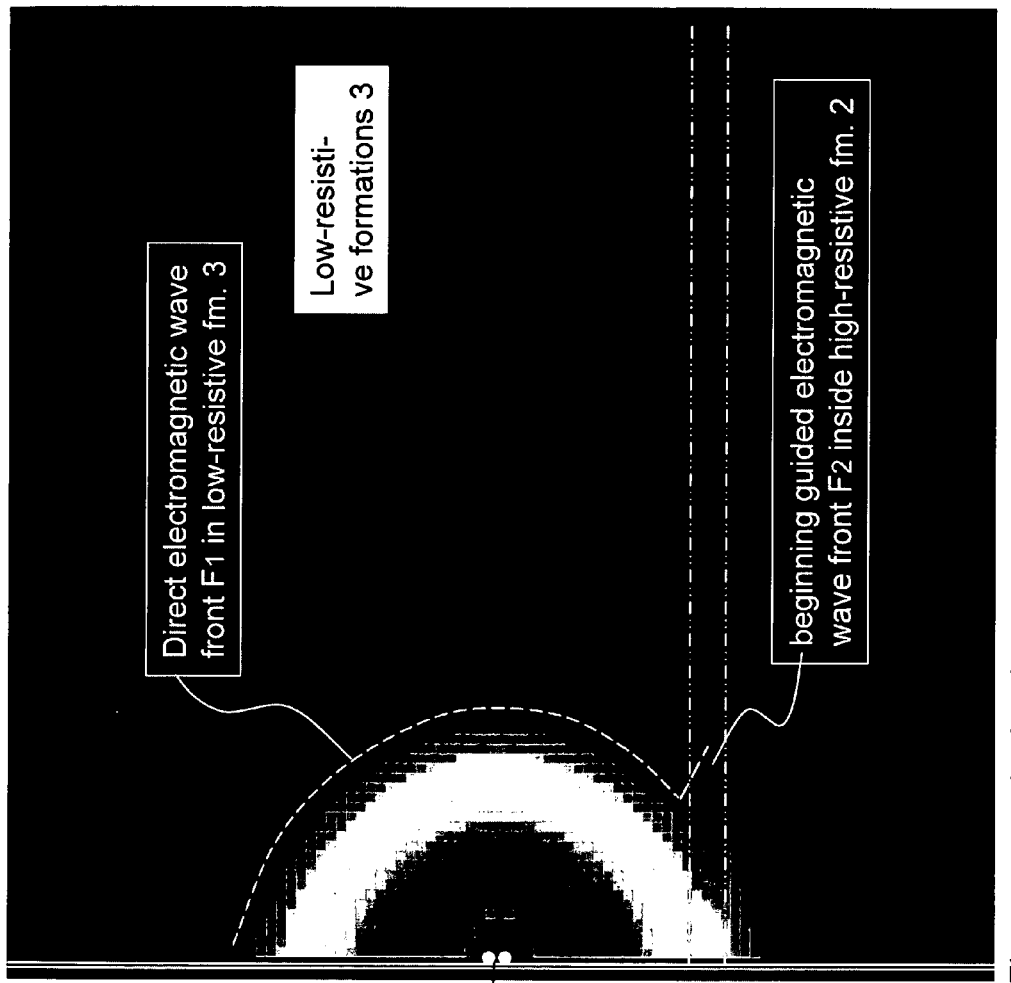
FIG. 6 is similar to FIG. 5, and is calculated for t=2000 microseconds. The direct wave through the rocks, and also a wave along the casing, has by this instant propagated down to a high-resistivity formation. Propagation of a guided wave is commencing into a high-resistivity formation having higher propagation speed than the direct wave. The high resistivity formation could not be discerned in the previous image.

FIG. 6 is similar to FIG. 5, and is calculated for t=2000 microseconds. The direct wave through the rocks 3, and also a wave along the casing 7, has by this instant propagated down to a high-resistivity formation 2. Propagation of a guided wave in a wave front $F_2$ is commencing into a high-resistivity formation 2 having a lower resistivity and thus a higher propagation speed than the direct wave. The high resistivity formation 2 could not be discerned in the previous calculated image.

Figure 7:
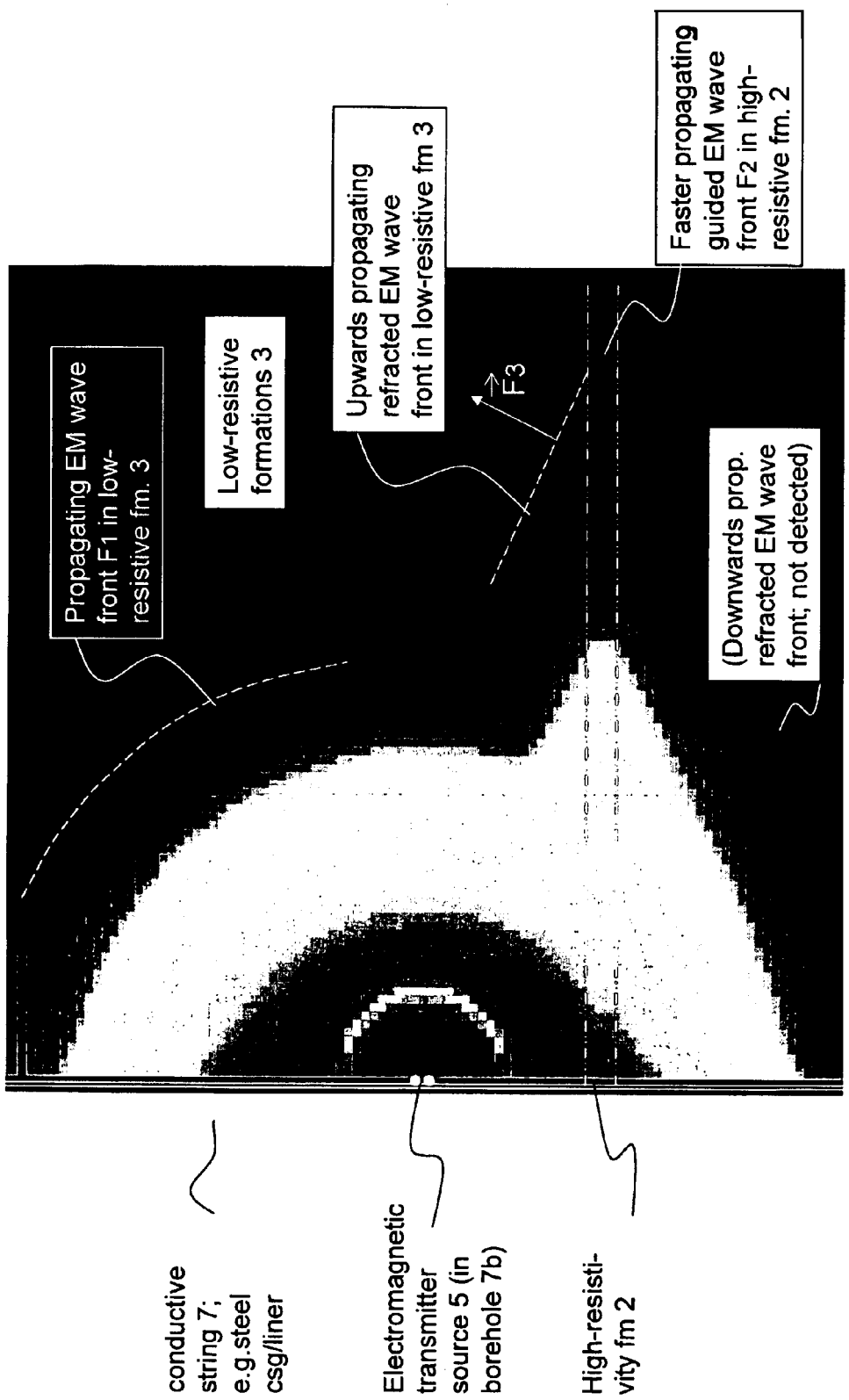
FIG. 7 is similar to FIGS. 5 and 6, now calculated for t=10000 microseconds. The guided wave has propagated far into the right portion of the high-resistivity formation and is "leaking" refracted waves upwards (and downwards) showing as a rather steeply upwards (and downwards) propagating refracted wave front. At this point of time, it is becoming obvious that the refracted EM wave front propagates faster through the low-resistivity formation.

FIG. 7 is similar to FIGS. 5 and 6, and is calculated for t=10000 microseconds. The guided wave has propagated far into the right portion of the high-resistivity formation and is "leaking" refracted waves upwards (and downwards) showing as a rather steeply propagating refracted wave front $F_3$.

The guided wave has propagated far into the right portion of the high-resistivity formation 2 and is "leaking" refracted waves upwards (and downwards) showing as a rather steeply upwards (and downwards) propagating refracted wave front $F_3$ through the low-resistivity formation 3. At this point of time, it is becoming obvious that a forward portion of the refracted EM wave front through formation 3 propagates ahead of the direct wave front $F_1$ in formation 3.

Figure 8:
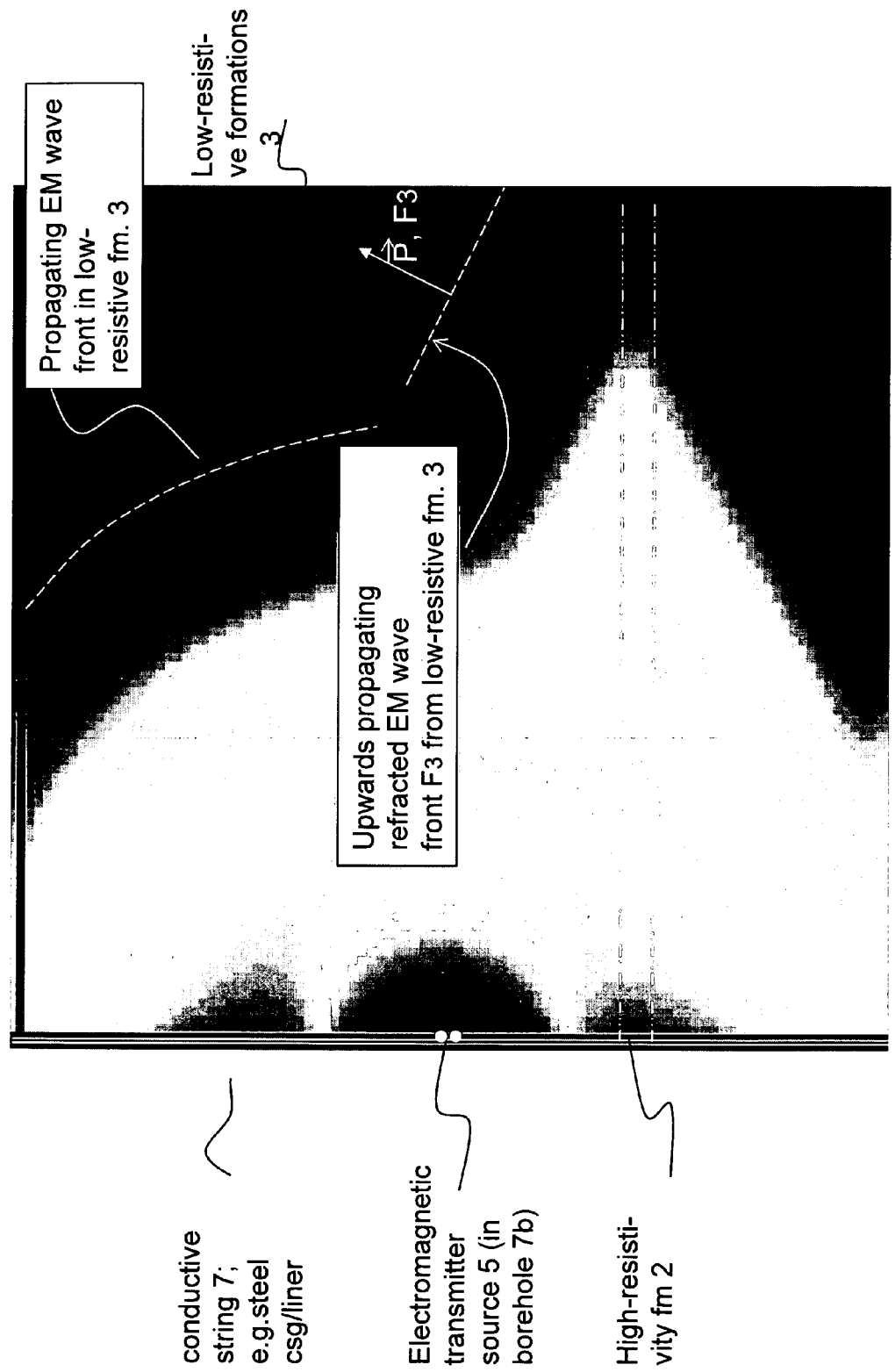
FIG. 8 is rather similar to FIG. 7, showing a development at a propagation time of 20000 microseconds, or 0.02 seconds. For observation stations arranged beyond some distance along the seafloor (or surface) the refracted wave will appear first on sensors. The refracted wave speed will, due to the steep direction of real propagation, appear higher, as calculated from phase differences at sensors 6, than the speed of the direct wave.

FIG. 8 is rather similar to FIG. 7, showing a development at a propagation time of 20000 microseconds, or 0.02 seconds. For observation stations with receiver antennas 6a, 6b, 6c, ..., 6k, ..., 6n on the seafloor 1 arranged beyond some distance along the seafloor (or surface), the refracted wave will appear first on the sensors 6, if a refracted wave occurs at that station. The refracted wave speed will, due to the steep direction of real propagation, appear higher, as calculated from phase differences at sensors 6, than the speed of the direct wave, and will, above the reservoir portion of formation 2 indicate the propagation speed of EM waves in the reservoir.

Figure 9:
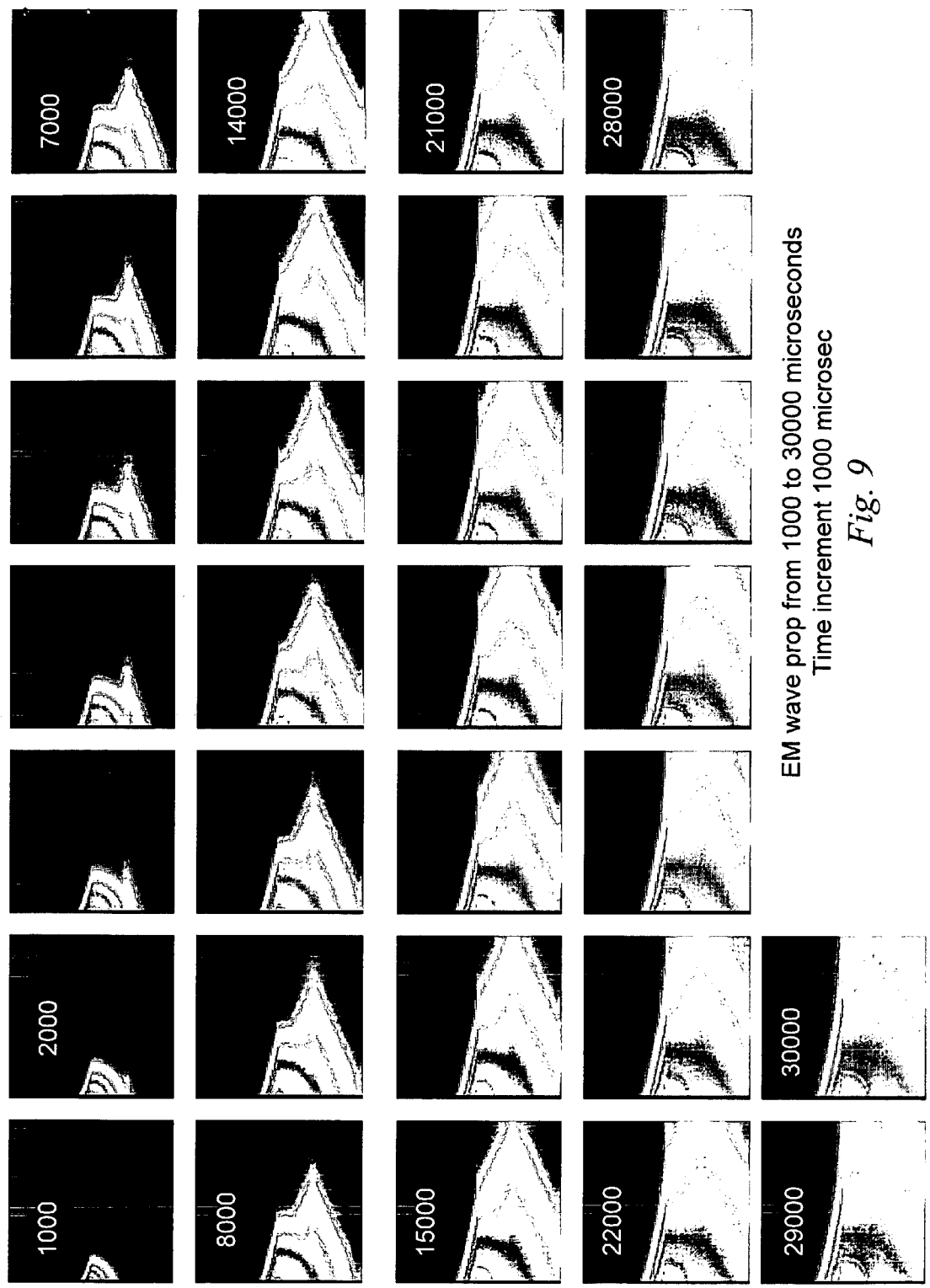
FIG. 9 illustrates a series of calculated vertical sections through another, similarly simplified model of a low-resistivity formation being covered by conductive seawater. The material model behind these calculated sections is illustrated in FIG. 9b. The image illustrates the EM propagation through a rock formation. The seafloor is situated at 2500 m depth of seawater. The rock beds of the model extend to a depth of 2500 meters below the seafloor, i.e. 5000 m below the sea surface. The horizontal extent of the model is 5000 meters. As with FIG. 4, a thinner, high-resistivity horizontal formation exists somewhere in the lower half of the image. The approximate position will emerge in the images for time section images after 2000 or 3000 microseconds, i.e. the second or third image. From the seafloor and down, the formations are penetrated by a well at the left side of each image, the well having a conductive casing, usually made of steel.
Figure 9B:
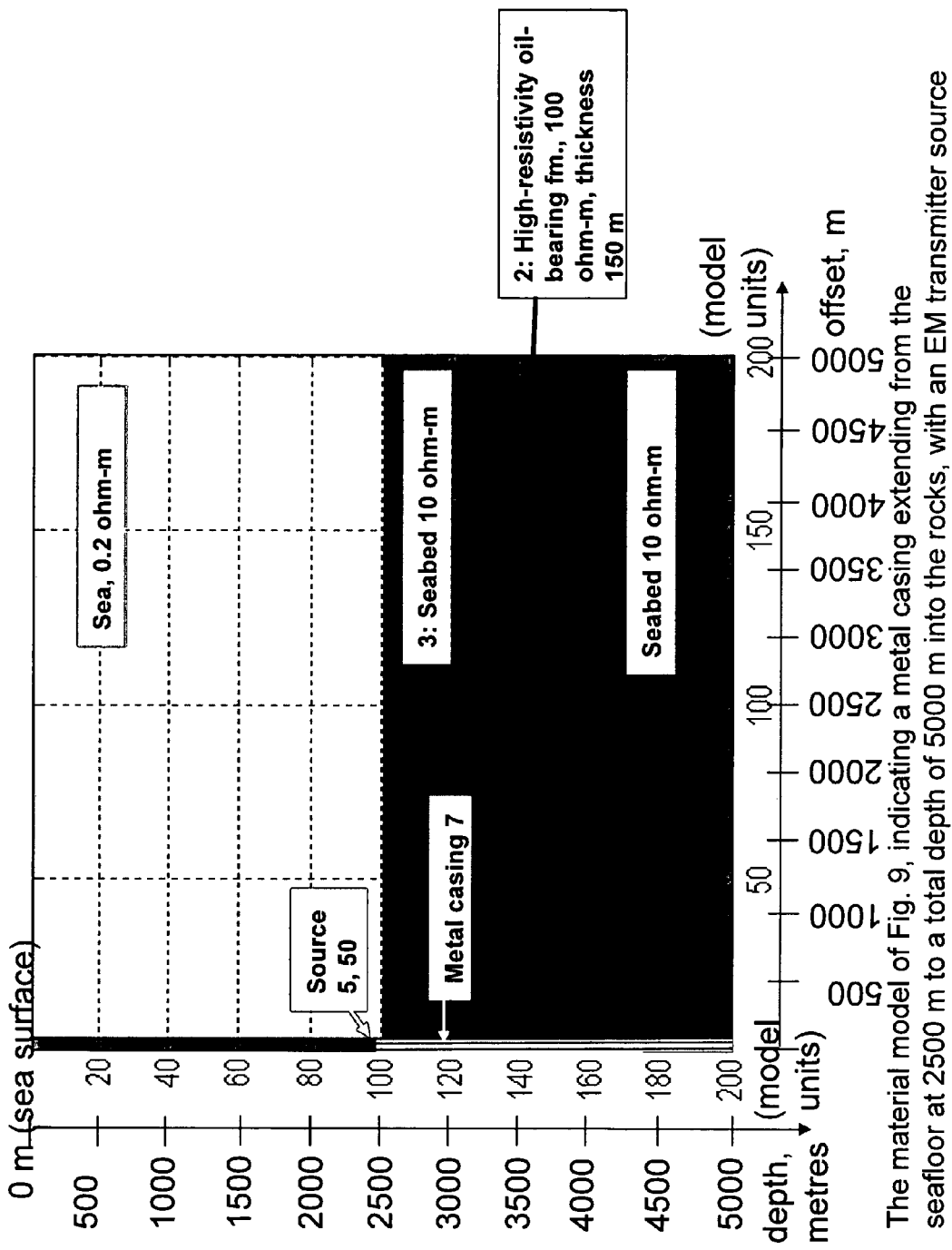
FIG. 9b illustrates the material model for calculating the EM field propagation of FIG. 9. The thin, high-resistivity formation mentioned above has an upper interface at 1000 m below the seafloor, and a thickness of 150 m. The resistivity of the high-resistivity formation is 100 Ωm. The overburden rocks above and the rocks below has a uniform resistivity of 10 Ωm.

FIG. 9 illustrates a series of calculated vertical sections through another, similarly simplified model of a low-resistivity formation 3 being covered by conductive seawater 4. The material model behind these calculated sections is illustrated in FIG. 9b. The image illustrates the EM propagation through a rock formation 3. The seafloor 1 is situated at 2500 m depth of seawater. The rock beds 3 of the model extend to a depth of 2500 meters below the seafloor, i.e. 5000 m below the sea surface. The horizontal extent of the model is 5000 meters. As with FIG. 4, a thinner, high-resistivity horizontal formation 2 exists somewhere in the lower half of the image. The approximate position will emerge in the images for time section images after 2000 or 3000 microseconds, i.e. the second or third image. From the seafloor 1 and down, the formations 3, 2 are penetrated by a well at the left side of each image, the well having a conductive casing 7, usually made of steel.

With the progress of time, the overall image comprising the initial spherical wave being the direct wave propagating through the low-resistivity formation 3 becomes more and more distorted by the faster guided wave front through the low-resistivity formation 2 and the refracted EM wave front through formation 3. One will also see the slower EM wave front through the sea 4 being distorted by the refracted direct wave through the low-resistivity formation 3 and later also by the refracted wave from formation 2. Clearly, after 30000 microseconds, the refracted EM wave front from the high-resistivity formation 2 through formation 3 dominates the image. Also note the "onion"-shaped image of the intensity field with a downwards pointing tip along the casing string 7, well seen from the two latest calculated images at 29000 and 30000 microseconds. This tip shape may be due to the energy or power concentration is higher along the casing string 7.

FIG. 9b illustrates the material model for calculating the EM field propagation of FIG. 9. The thin, high-resistivity formation 2 mentioned above has an upper interface at 1000 m below the seafloor, and a thickness of 150 m. The resistivity of the high-resistivity formation 2 is here 100 Ωm. The overburden rocks 3 above and the rocks below have a uniform resistivity of 10 Ωm. This internal resistivity uniformity of the overburden rocks 3, and also of the underlying rocks 3, is of course not the actual case in nature, which will have an internal variation of resistivity depending on stratigraphical variations, metamorphosis and water and oil migration. In the mathematical model used for the calculations, the distance unit and thus the resolution is 25 m.

| Layer | Resistivity | Vertical extension |
|---|---|---|
| Seawater layer: | 0.2 ohm-m | Depth = 0 m to 2500 m |
| Seabed low-resistivity layer: | 10 ohm-m | Depth = 2500 m to 3500 m (1000 m thickness) |
| High-resistivity formation: | 100 ohm-m | Depth = 3500 m to 3650 m (150 m thickness) |
| Low-resistivity Lower Seabed layer: | 10 ohm-m | Depth = 3650 m to 5000 m |

Further, in FIG. 9b, the source is at the seafloor on the top of the casing at y=2500 m depth x=300 m from the left edge. Imagined points for receivers 6a, 6b, 6c, ..., are also arranged at every point of the model along the seafloor 1 at y=2500 m at different x values with 25 meters spacing. The imagined source 5 is an alternating circular magnetic field. This will induce current flowing along the metal casing 7. In this case, the metal casing 7 becomes an electrical dipole. A single cycle 100 Hz signal is used for simulation. Total propagation time in the model is 30 ms, i.e. 30000 microseconds. The casing-lined borehole 7b is at the y-axis at the left side of the image.

Figure 10:
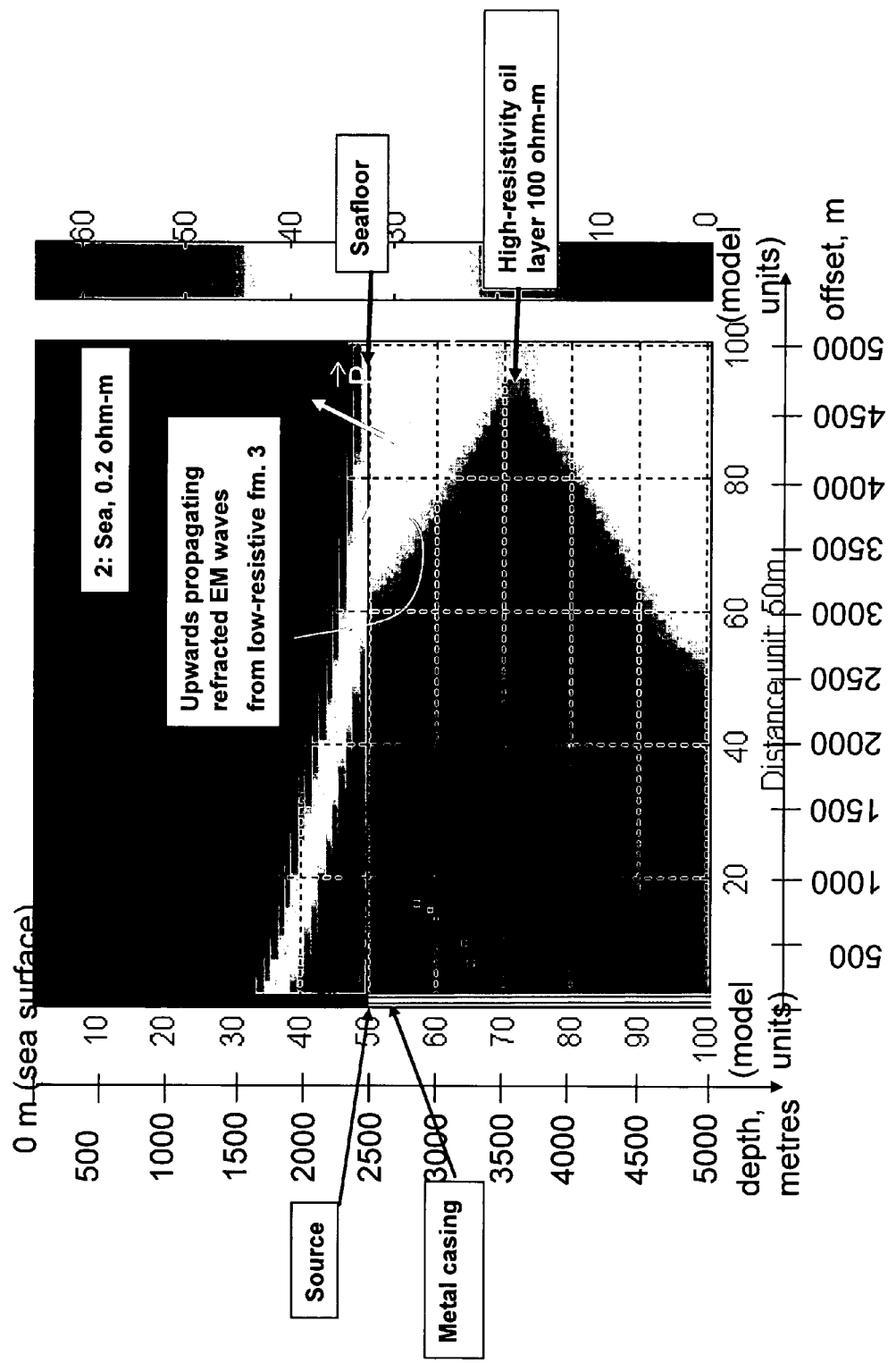
FIG. 10 is a vertical section of a modelled embodiment of the invention, an image based on the model of FIG. 9b. The image shows an electromagnetic intensity as calculated for a time of 30000 microseconds of propagation through the rocks, from the source. In the illustrated case the preferred embodiment uses a transmitter antenna near the seabed, and preferably at the top of a casing-lined borehole. In this example, the casing extends all the way from the seafloor at 2500 m, down to a total depth of 5000 m. The casing has thus a total length of 2500 m.

FIG. 10 is a vertical section of a modelled embodiment of the invention, an image based on the model of FIG. 9b. The image shows an electromagnetic intensity as calculated for a time of 30000 microseconds of propagation through the rock model, from the source 5. In the illustrated case the preferred embodiment uses a transmitter antenna 50 near the seabed, and preferably at the top of a casing 7-lined borehole 7b. In this example, the casing 7 extends all the way from the seafloor at 2500 m and down to a total depth of 5000 m. The casing 7 has thus a total length of 2500 m. The horizontal extent of the calculated image is 5000 m. The model is calculated with a 50 m resolution in both the vertical and horizontal directions. Notice in FIG. 10 the "onion"-shaped (having a downward directed tip) distribution of energy intensity about the conductive casing. This shape indicates that the casing 7) is an excellent transmission path for electromagnetic energy from the transmitter 5 near the sedimentary surface 1 and down into the geological formations. Much of this energy intensity propagates into the horizontal high-resistivity formation 2, as clearly emerges from FIG. 10. The energy is then transmitted as refracted waves upwards and downwards from the high-resistivity layer, which may heat the high-resistivity layer and also the surrounding layers 3, thus possibly stimulating the high-resistivity petroleum-bearing production zone 2. Some of the energy will eventually emerge as refracted waves at the sensor antennas 6 at the seafloor 1. Then the signals from the antennas 6 can be recorded and analyzed in order to estimate the physical electrical properties and to delineate the extent of the high-resistivity formation 2.

Also evident from this image is the much stronger refracted wave energy component arriving at the large-offset distance at the seabed 1 to the far right in the model. Also evident from the calculated image is the severe attenuation and slow propagation speed of EM waves in seawater 4.

Figure 11:
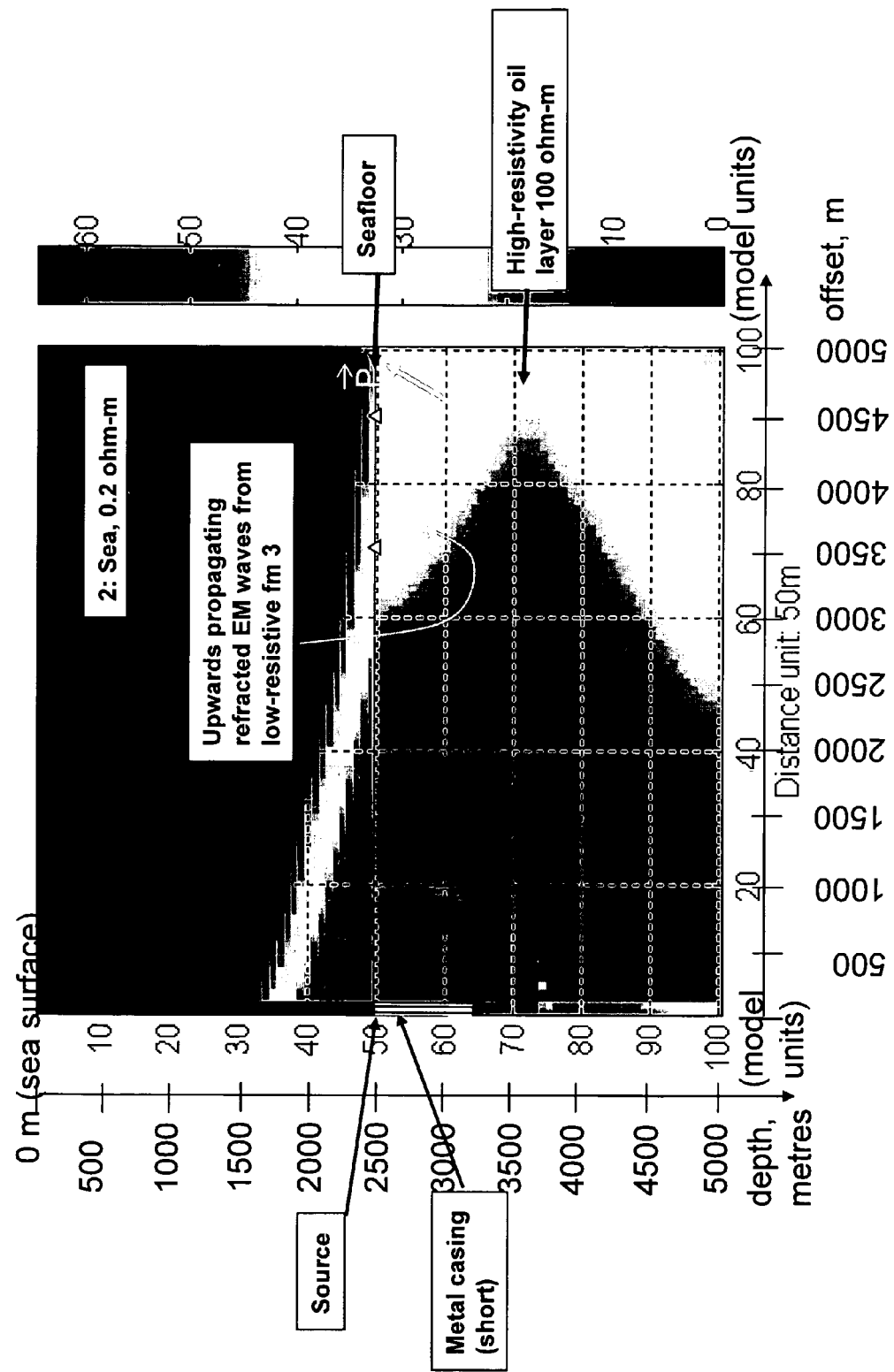
FIG. 11 is a vertical section of a modeled embodiment of the invention, an image based on a model similar to the model of FIG. 9b. An exception is that the casing used in the model for calculating

FIG. 11 is a vertical section of a modelled embodiment of the invention, an image based on a model similar to the model of FIG. 9b. An exception is that the casing 7 used in the model for calculating FIG. 11, is short, extending from the seafloor 1 and 500 meters down into the low-resistivity formation 3. Thus the steel casing 7 ends far above the high-resistivity formation 2. Clearly one can see that the upwardly propagating wave front marked "P" has propagated a shorter distance than the corresponding propagating wave front in FIG. 10, indicating the usefulness of having a conductive casing 7 extending at least down to the reservoir rock. Also evident is the fact that the amplitude attenuation in FIG. 11 with a short casing is somewhat more severe than when using a long casing, which will result in more electromagnetic energy propagating further into the low-resistivity formation 2.

Figure 12:
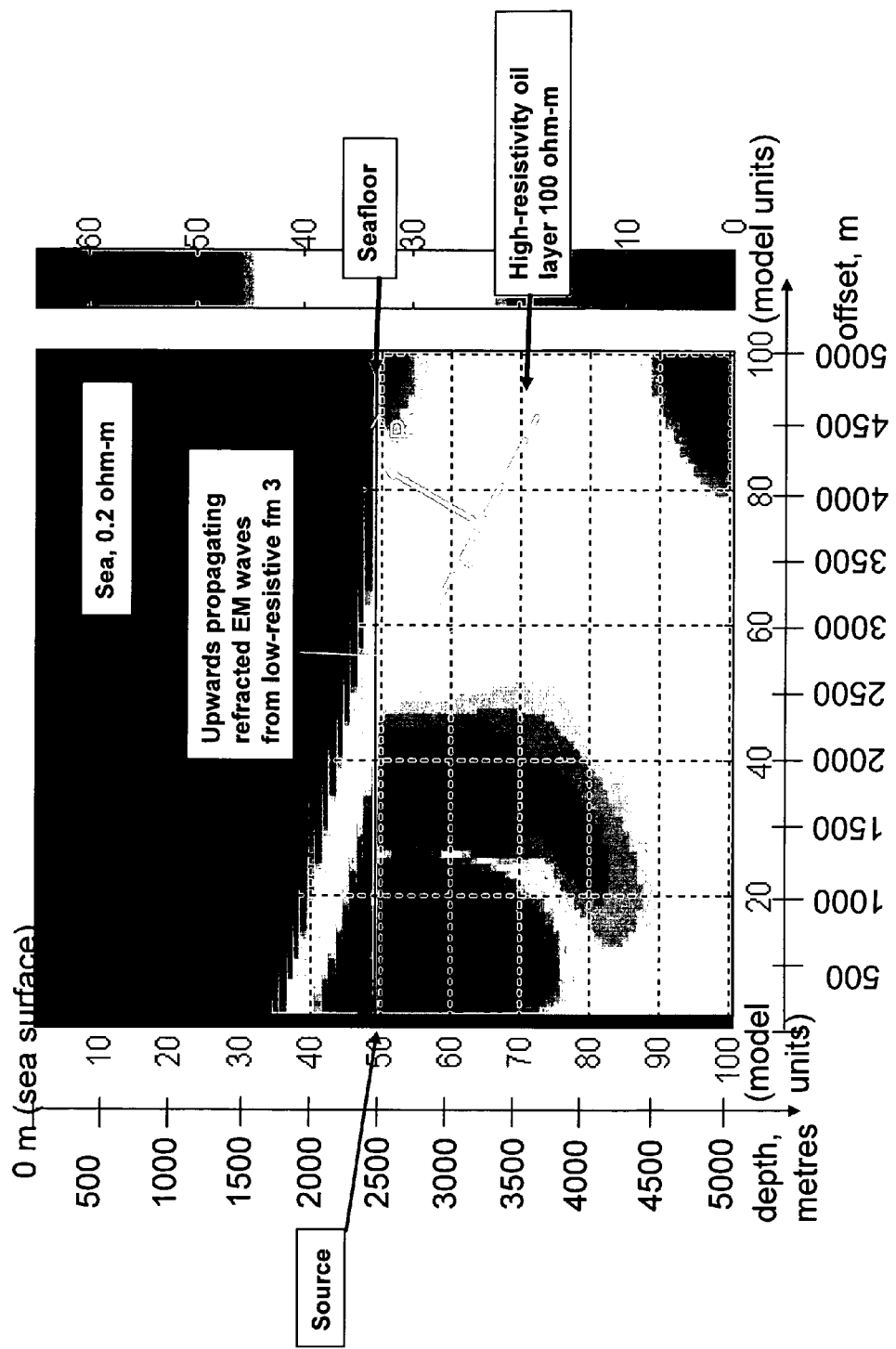
FIG. 12 is a vertical section of a modelled embodiment of the invention, an image based on a model similar to the model of FIG. 9b, except for that in the underlying model, no casing is arranged in the borehole.

FIG. 12 is a vertical section of a modeled embodiment of the invention; an image based on a model similar to the model of FIG. 9b, except for that in the underlying model, no casing is arranged in the borehole. Clearly, the signal is much more severely attenuated and the signal strength to be received as a refracted wave is much weaker than in the two previous examples. Comparing the effects of three different situations as described above:

FIG. 10, a deep casing penetrating the high-resistivity formation,

FIG. 11, a shallow casing of about half the length (500 m) necessary to reach the high-resistivity formation (d=1000 m, thickness 150 m), and FIG. 12, no casing, will reveal the following:

Firstly, the refracted wave moves faster to the high-resistivity formation 2. This can be clearly seen when comparing the FIGS. 10, 11, and 12.

Secondly, the intensity of the refracted wave as received at the stations along the seabed is much higher for the deep casing situation, but also acceptable for the shallow (500 m) casing situation. This may be summarized in Table 1.1:

TABLE 1.1

Received signal magnitudes for different casing ("antenna") lengths, versus offset distances R. R is the so-called "offset", the receiver distance from transmitter. The signal amplitudes are normalised by the received signal for the configuration of "no conductive casing".

|  | R = 2500 m | R = 3500 m | R = 4500 m |
|---|---|---|---|
| No conductive casing | 1 | 1 | 1 |
| 500 m conductive casing or "short casing" | 5.8 | 6.5 | 6.2 |
| 2500 m conductive casing | 7.4 | 12.8 | 12.0 |

Figure 13:
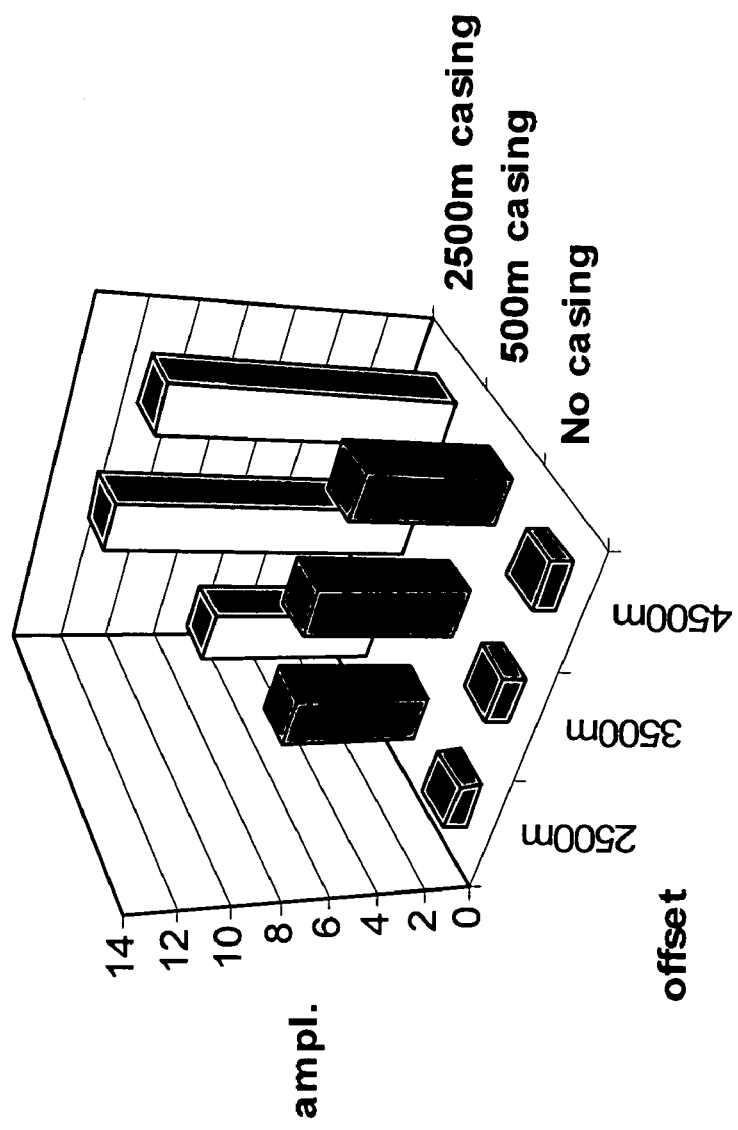
FIG. 13 is a diagram with a comparison between signal amplitudes as potentially measured at the seabed in the imagined situations of having no casing, a short casing and a long casing.
Figure 14:
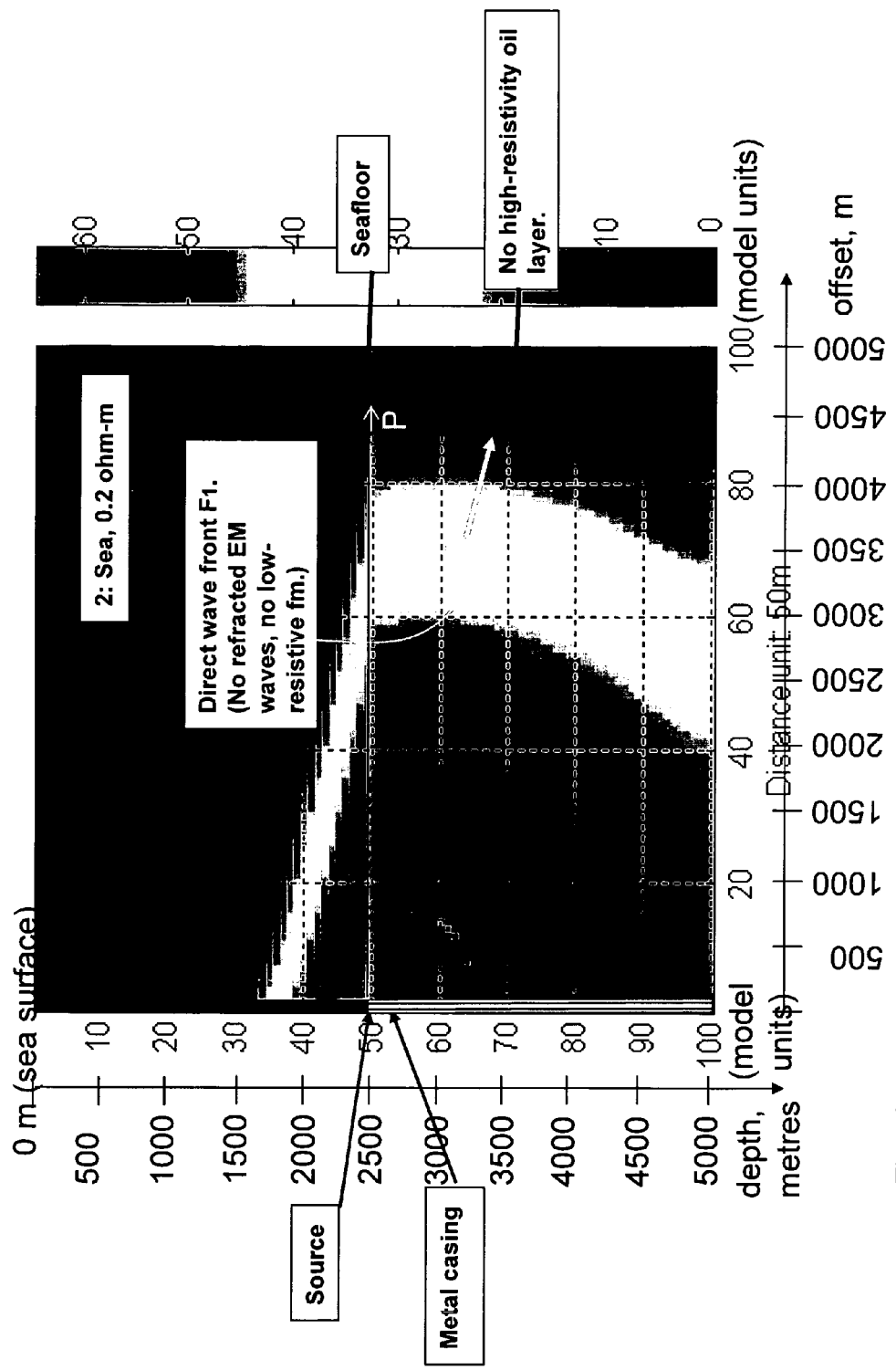
FIG. 14 is a vertical section being comparable to the time section of FIG. 10, with the important exception of no high-resistivity formation in the seabed, but otherwise with a casing present. The purpose of FIG. 14 is dual; firstly, to show that in the method of injecting electromagnetic energy into a reservoir, the presence of a high-resistivity zone being a prerequisite for detecting refracted waves; secondly, to illustrate the significance with which one may see; that the presence of a metal casing results in a strongly improved injection of EM energy into the seabed formations as compared to the situation in FIG. 12 which is without a metal casing.

The differences between long and short casing 7, and "no casing" in the table above is illustrated in FIG. 13 which is a three-dimensional column diagram showing offset along one horizontal axis, the three examples of "no casing", "500 m casing" and "2500 m casing" along the second horizontal axis, and the relative amplification normalized by the responses with "no conductive casing".

The example of FIG. 12: "no casing" represents the known art in which a transmitter antenna is arranged at the seabed and not being in the vicinity of any vertical conductive casing.

Improving the signal by a factor of twelve as for the example with remote offsets for the long casings is significant. The relative signal amplifications shown in the examples of "500 m casing" and "long casing" clearly quantify the advantages of the invention. Also, without further calculations, we believe that the "500 m casing" or so-called "short casing" may as well be a conductive drillstring as illustrated under FIG. 3d and discussed above.

In one embodiment of the invention, a method is used in which a transmitter antenna 5 is arranged near a petroleum bearing formation 2. The petroleum bearing formation 2 may be under production, like illustrated in FIGS. 3a, 3b, 3c. The resistivity of the petroleum bearing formation is $\rho_{2oil}$ which may be about 50 to 100 $\Omega$m, and in the water intruded portion of the formation of the otherwise same geological formation 2 the resistivity is $\rho_{2water}$ which may be significantly lower, about to 1 to 5 $\Omega$m. In the overlying formations 3 the resistivity is $\rho_3$ which may be about 1 $\Omega$m, not very different from the resistivity of the otherwise water-filled portions of the petroleum bearing formation 2.

Vertically polarized electromagnetic waves will thus be less attenuated and move faster in the petroleum bearing layer 2 than in the overlying geological formations 3. Electromagnetic signals will be refracted ("leak") out to layer 3 and propagate with a refraction angle Vr according to Snell's law. In the resistivity contrast described above, the refraction angle will be very small, and the exit direction will thus be very near the vertical. At the end of and beyond the petroleum bearing formation the EM signal will be heavily attenuated and the refraction angle will be much greater, resulting in a much "flatter" propagation direction. Thus the receivers up to the last steep refraction from the petroleum-bearing reservoir should register a significantly higher electromagnetic field in the horizontal direction (normal to the near-vertical propagation direction) than outside of the "footprint" on the seabed of the petroleum reservoir. The method should work as well on land, except for a possibly reduced resistivity of the overburden formations that would incur a shallower refraction angle Vw.

One new reservoir mapping criteria, according to the invention, is the fact that the apparent velocity as registered by the receivers above the high-resistivity portion A1 of the reservoir will be considerably higher than for receivers arranged above low-resistivity, probably water-saturated parts A2 of the possibly same geological formation. This apparent velocity can be calculated by using the phase differences between the receivers 6, and is an expression of the resistivity of the underlying reservoir. High resistivity means high apparent velocity.

Another similar aspect of the invention comprises the method of detecting a strong amplitude of said detected refracted electromagnetic wave front $F_3$ along the seafloor as registered along said array of sensor antennas 6a, 6b, 6c, . . . , 6k, . . . , 6n along said seafloor, in order to distinguish a first horizontal area A1 having high resistivity indicating oil-wet or oil saturated rocks of said formation 2, from a horizontal area A2 of lower resistivity indicating water-wet or water saturated rocks, possibly in the same formation.

Not only the geometry of the reservoir may be mapped, but also changes in resistivity, which may be due to a spatial variation of reservoir quality, i.e. given that high resistivity relates to good reservoir quality. This means that the method of the invention may be used for monitoring changes of resistivity during production and/or during and after water injection, in which it would be helpful to monitor the movements of injected water, and for monitoring remaining hydrocarbons in the reservoir.

The toroidal coil antenna 50 described above generates a so-called transverse-magnetic (TM) mode signal relative to the conductive casing, to propagate down along the casing string 7, see FIG. 3c. Such a TM-mode signal will generate a vertical polarization of the high-resistivity formation 2 above and below a horizontally deviated conductive casing 7. In addition to the above mentioned transverse magnetic mode, one could use a simple coil antenna in which each loop is arranged around the top of the casing, for generating the so-called transverse-electric (TE) mode source relative to the casing. The TE mode signal would generate a vertical polarization of the high-resistivity formation 2 to either sides of the same horizontally deviated conductive string 7, and is indicated in FIG. 3c. Thus, a TM-mode and a TE-mode could be used in combination as signal generating modes for outlining an extent of a high-resistivity petroleum-bearing part of a geological formation 2. The sideward lobes would be out of phase. This feature should apply also during horizontally deviated drilling, using a conductive drillstring.

The invention claimed is:

1. A method for monitoring a high-resistivity reservoir rock formation located below at least one less resistive formation, wherein said method comprises:
    transmitting an electromagnetic signal (S) propagating from near a sea-floor by means of an electromagnetic transmitter powered by a voltage or current signal generator;
    said electromagnetic transmitter comprises two electrodes of which one is connected to an upper end of an electrically conductive string in a well, said upper end being arranged near said seafloor;
    said electromagnetic signal (S) propagating from said sea-floor to said high resistive formation as a guided-wave electromagnetic signal (S1) along said conductive string, and further propagating as a guided-wave electromagnetic signal (S2) inside said high-resistivity formation;
    said electromagnetic signal (S2) giving rise to an upward refracting electromagnetic signal (R3) in said less resistive formation, said electromagnetic signal (R3) rising from an interface between said high-resistivity formation and said lower-resistivity formation, and giving rise to a steeply rising refraction wave front (F3); and
    detecting said refracted electromagnetic wave front (F3) comprising refracted electromagnetic signals (R3), along an array of sensor antennas located along said sea-floor, said array of sensor antennas having a direction away from said transmitter.

2. A method according to claim 1, wherein a first of said electrodes is connected to said upper end of said electrically conductive string for integrating part of said conducting string in a signal path for transmitting said electromagnetic signal (S), and a second of said electrodes is grounded, said first and second electrodes being supplied with electrical energy from said voltage signal generator.

3. A method according to claim 1, wherein said electrically conductive string is a borehole casing that is cemented to a borehole wall by cement having a resistivity that is higher than the resistivity of said at least one low-resistivity formation, said cement providing improved waveguide properties for said electrically conductive string through said at least one low-resistivity formation for propagating said electromagnetic signals along said electrically conductive string.

4. A method according to claim 1, further comprising detecting apparent horizontal speeds of said detected refracted electromagnetic wave front (F3) along the seafloor as registered along different areas (A1, A2) along said array of sensor antennas in order to distinguish a first horizontally extending area showing higher apparent horizontal speeds indicating a presence of oil-wet or oil-saturated rocks of said high-resistivity reservoir rock formation, from a second horizontal area (A2) of lower apparent horizontal speeds indicating a presence of water-wet or water-saturated rocks having lower resistivity in the same geological formation.

5. A method according to claim 4, wherein said apparent horizontal speed of said received refracted signal wave front (F3) is calculated on the basis of phase angle differences between the signal received at said array of sensor antennas which have different offsets along the seafloor.

6. A method according to claim 1, wherein said method comprises detecting amplitudes of said detected refracted electromagnetic wave front (F3) along the seafloor as registered in different horizontal areas (A1, A2) along said array of sensor antennas along the seafloor in order to distinguish a first horizontal area (A1) having relatively higher amplitudes indicating relatively higher resistivity due to oil-wet or oil-saturated rocks of said high-resistivity reservoir rock formation, from a horizontally extending area (A2) of relatively lower amplitudes indicating relatively lower resistivity due to water-wet or water saturated rocks in the same geological formation.

7. A method for monitoring a high-resistivity reservoir rock formation located below at least one lower-resistive formation, said method comprising:

transmitting an electromagnetic signal (S) propagating from near a sea-floor by means of an electromagnetic transmitter powered by a voltage or current signal generator, wherein said electromagnetic transmitter comprises an antenna transmitting said electromagnetic signal (S) to an upper end of an electrically conductive string, said upper end of said electrically conductive string being arranged near said seafloor, said electromagnetic signal (S) propagating from said sea-floor to said high-resistivity reservoir rock formation as a guided-wave electromagnetic signal (S1) along said conductive string, and further propagating as a guided-wave electromagnetic signal (S2) inside said high-resistivity reservoir rock formation, said electromagnetic signal (S2) giving rise to an upward refracting electromagnetic signal (R3) in said at least one lower-resistive formation, said electromagnetic signal (R3) rising from an interface between said high-resistivity reservoir rock formation and said at least one lower-resistive formation, and giving rise to a steeply rising refraction wave front (F3); and detecting said refracted electromagnetic wave front (F3) comprising refracted electromagnetic signals (R3) along an array of sensor antennas located along said sea-floor, said array having a direction away from said electromagnetic transmitter.

8. A method according to claim 7, wherein said electrically conductive string comprises a steel casing or a liner.

9. A method according to claim 7, wherein a lower end of said electrically conductive string penetrates at least an upper interface between said high-resistivity reservoir rock formation and said at least one lower-resistive formation.

10. A method according to claim 7, wherein said antenna transmits said electromagnetic signal (S) to said upper end of said electrically conductive string, and said antenna is a toroidal antenna receiving electrical energy from said voltage signal generator.

11. A method according to claim 7, wherein a lower end of said electrically conductive string resides at a depth intermediate between said seafloor and said high-resistivity reservoir rock formation, and does not penetrate an upper interface between said high-resistivity reservoir rock formation and said at least one lower-resistive formation.

12. A method according to claim 11, wherein said toroidal antenna is arranged so as to substantially envelope said upper end of said electrically conductive string.

13. A method according to claim 11, wherein said toroidal antenna is provided with a ring core having high permeability.

14. A method according to claim 11, wherein said electromagnetic signal (S) has a frequency in a range of 0.1 Hz and 1000 Hz.

15. A method according to claim 11, wherein the power supplied by said generator is in a range of 10 W and 10 kW.

16. A method for monitoring a subterranean petroleum bearing formation having higher relative resistivity and being buried under other rock formations having lower relative resistivity, using polarized electromagnetic waves, said method comprising:

arranging a transmitter antenna comprising a pair of electrodes arranged in a borehole crossing said petroleum bearing formation, wherein said electrodes are arranged above and below said petroleum bearing formation, respectively;

arranging one or more receiver antennas along a seafloor above said rock formations, said antennas being provided to receive the polarized electromagnetic waves;

emitting vertically polarized waves from said transmitter antenna into said petroleum bearing formation; and receiving refracted electromagnetic waves by means of said receiving antennas arranged along the seafloor above said petroleum bearing formation; and analyzing geometric properties of said petroleum bearing formation.

17. A method according to claim 16, wherein said vertically polarized waves have a frequency in a range of 0.1 Hz and 1000 Hz.

* * * * *